(12) United States Patent
Nagaki et al.

(10) Patent No.: US 11,700,465 B2
(45) Date of Patent: Jul. 11, 2023

(54) SOLID-STATE IMAGING ELEMENT, IMAGING DEVICE, AND SOLID-STATE IMAGING ELEMENT CONTROL METHOD

(71) Applicant: SONY SEMICONDUCTOR SOLUTIONS CORPORATION, Kanagawa (JP)

(72) Inventors: Naoto Nagaki, Kanagawa (JP); Takao Konishi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/756,466

(22) PCT Filed: Dec. 1, 2020

(86) PCT No.: PCT/JP2020/044592
§ 371 (c)(1),
(2) Date: May 25, 2022

(87) PCT Pub. No.: WO2021/112059
PCT Pub. Date: Jun. 10, 2021

(65) Prior Publication Data
US 2023/0007194 A1  Jan. 5, 2023

(30) Foreign Application Priority Data
Dec. 6, 2019  (JP) .................. 2019-220811

(51) Int. Cl.
*H04N 25/671*  (2023.01)
*H04N 25/50*  (2023.01)
(Continued)

(52) U.S. Cl.
CPC .......... *H04N 25/671* (2023.01); *H04N 17/002* (2013.01); *H04N 25/50* (2023.01); *H04N 25/77* (2023.01)

(58) Field of Classification Search
CPC ...... H04N 25/50; H04N 25/671; H04N 25/77; H04N 17/002; H04N 25/677; H04N 25/69; H03M 1/10; H03M 1/08; H03M 1/12
See application file for complete search history.

(56) References Cited

U.S. PATENT DOCUMENTS 10,021,322 B2 *   7/2018   Kizuna ................ H03M 1/10
2009/0128653 A1   5/2009   Tanaka
(Continued)

FOREIGN PATENT DOCUMENTS

| JP | 2009-124513 A | 6/2009 |
| JP | 2017-060071 A | 3/2017 |
| JP | 2019-197940 A | 11/2019 |

OTHER PUBLICATIONS

International Search Report and Written Opinion of PCT Application No. PCT/JP2020/044592, dated Feb. 16, 2021, 08 pages of ISRWO.

*Primary Examiner* — Marly S Camargo
(74) *Attorney, Agent, or Firm* — Chip Law Group

(57) ABSTRACT

In a solid-state imaging element equipped with per-column ADCs, noise is reduced. A test signal source generates a test signal of a predetermined level. An analog-to-digital converter increases/decreases an analog signal according to an analog gain selected from among a plurality of analog gains, and converts the increased/decreased analog signal to a digital signal. An input switching section inputs, as the analog signal, either a test signal or a pixel signal to the analog-to-digital converter. A correction value calculation section obtains, on the basis of the test signal and the digital (Continued)

signal, a correction value for correcting an error in the selected analog gain, and outputs the correction value. A correction section corrects the digital signal according to the outputted correction value.

10 Claims, 30 Drawing Sheets

(51) Int. Cl.
*H04N 25/77* (2023.01)
*H04N 17/00* (2006.01)
*H04N 25/677* (2023.01)
*H03M 1/10* (2006.01)
*H03M 1/12* (2006.01)
*H03M 1/08* (2006.01)

(56) References Cited

U.S. PATENT DOCUMENTS

2012/0119063 A1* 5/2012 Takamiya .............. H04N 25/75
                                                     250/208.1
2017/0085823 A1   3/2017 Kizuna
2020/0406846 A1* 12/2020 Nakajima ................ H03M 1/12
2022/0417464 A1* 12/2022 Tatsuzawa ............. H04N 25/70

* cited by examiner

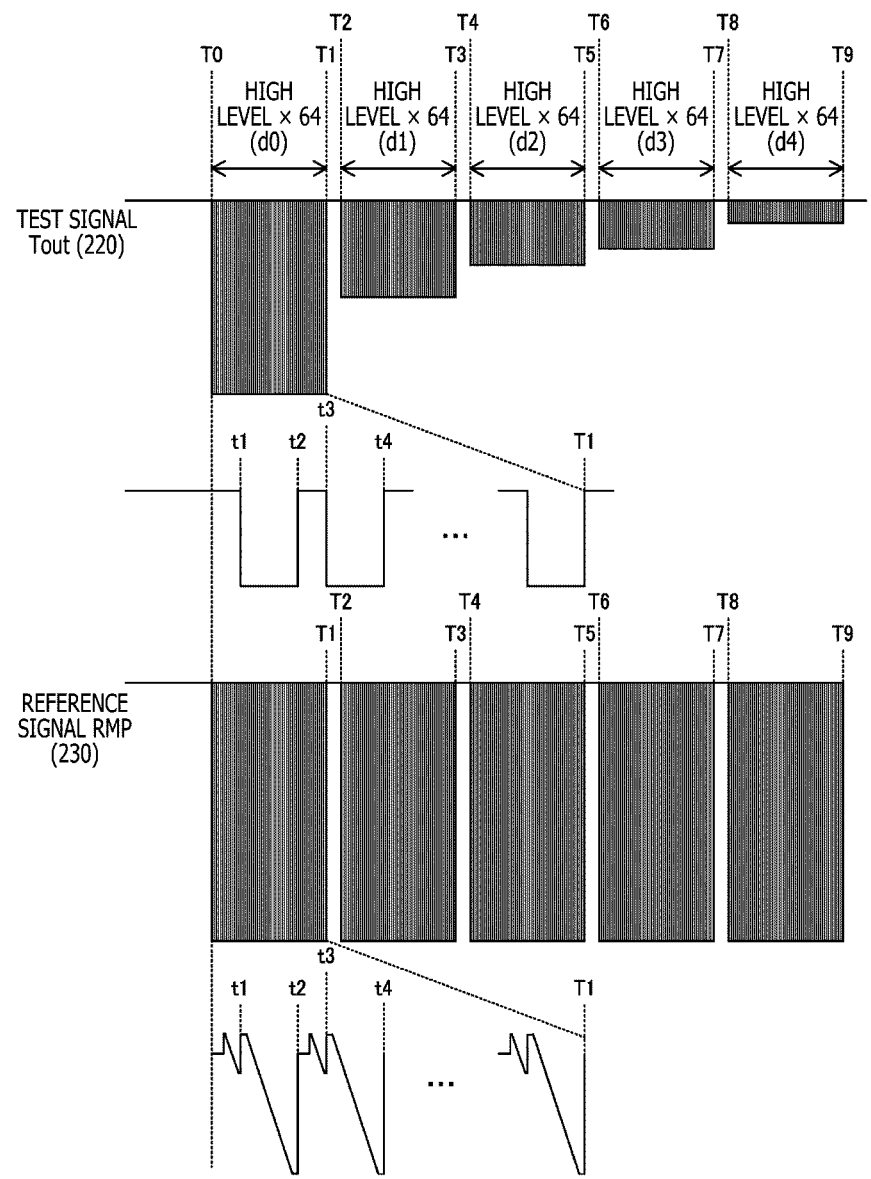

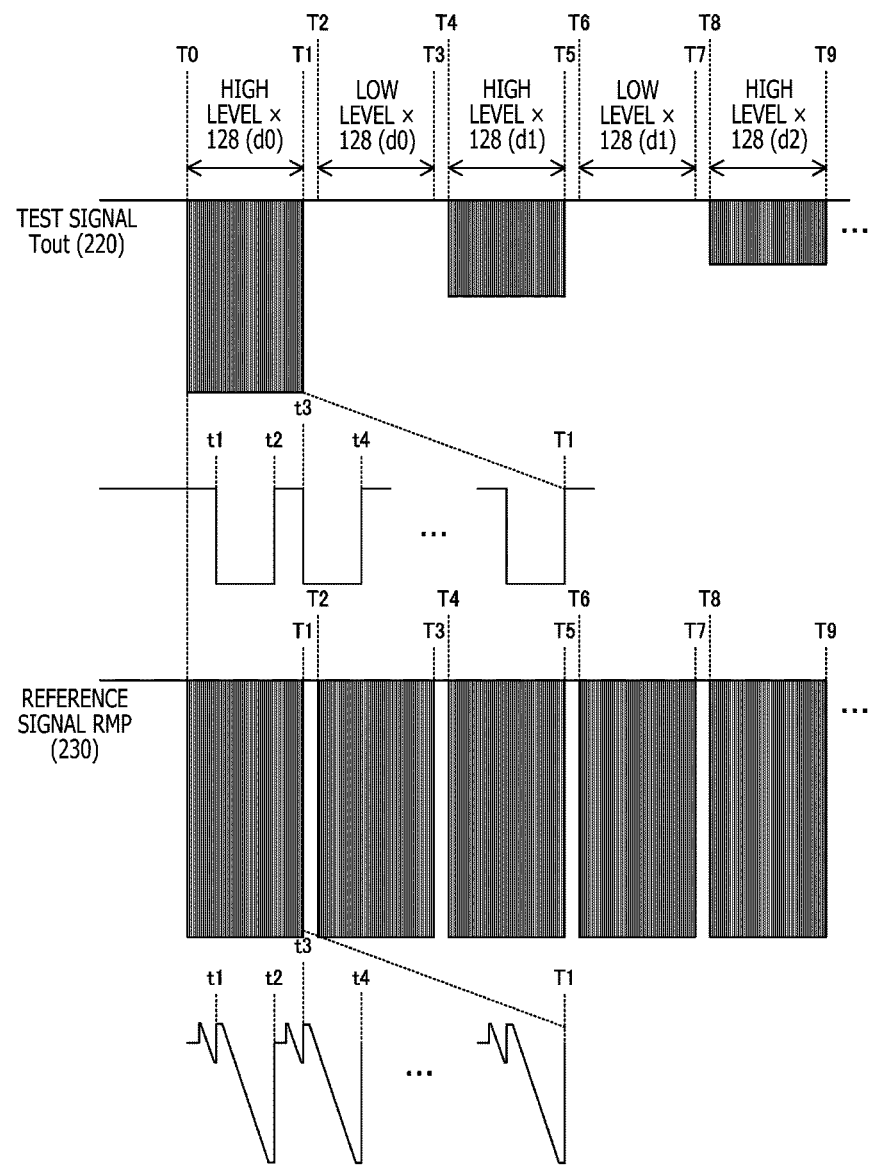

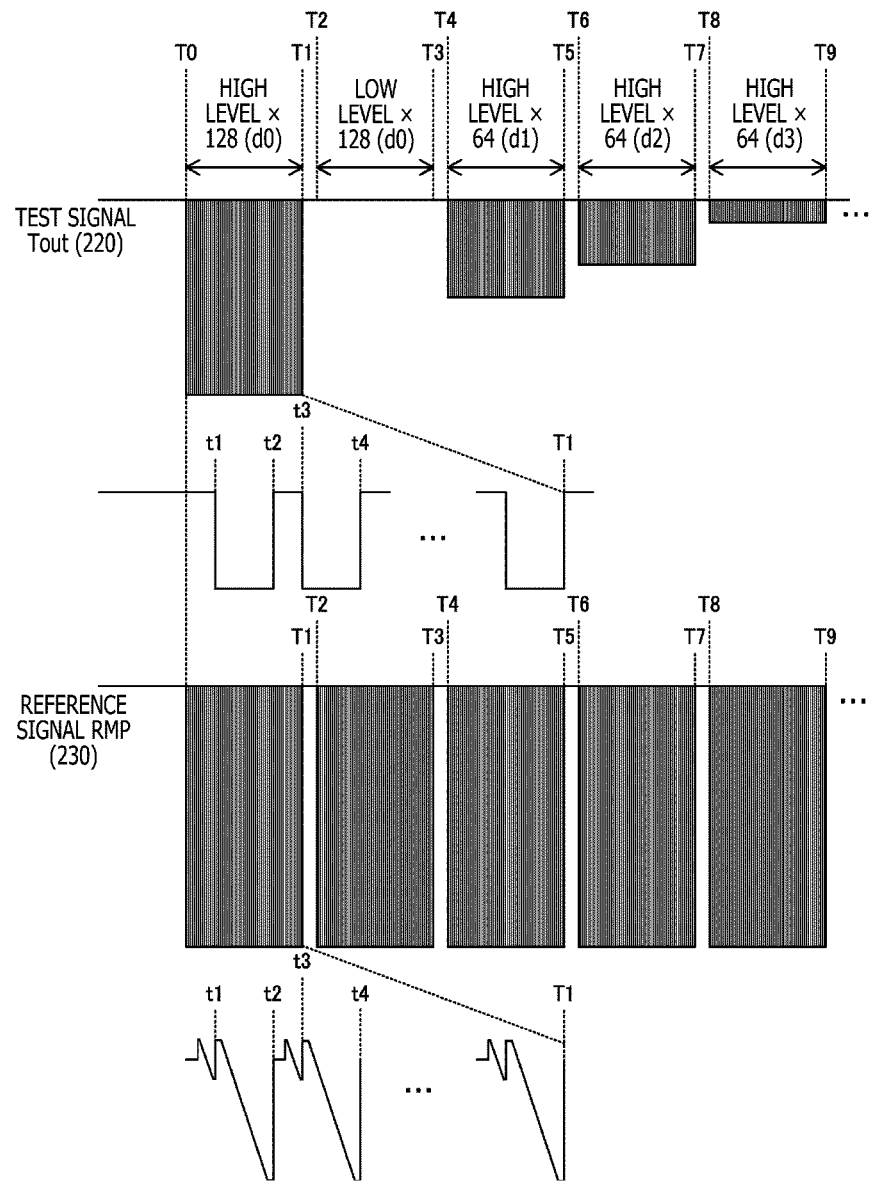

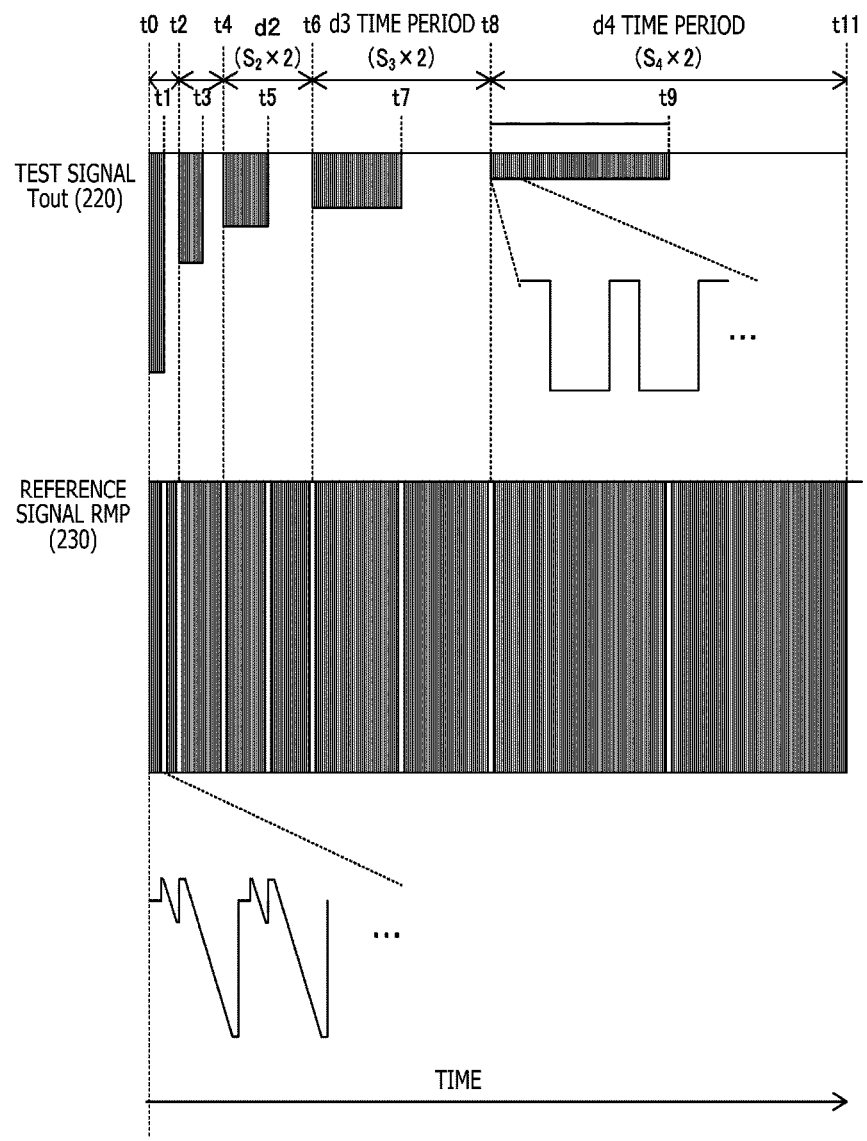

SOLID-STATE IMAGING ELEMENT, IMAGING DEVICE, AND SOLID-STATE IMAGING ELEMENT CONTROL METHOD

CROSS REFERENCE TO RELATED APPLICATIONS

This application is a U.S. National Phase of International Patent Application No. PCT/JP2020/044592 filed on Dec. 1, 2020, which claims priority benefit of Japanese Patent Application No. JP 2019-220811 filed in the Japan Patent Office on Dec. 6, 2019. Each of the above-referenced applications is hereby incorporated herein by reference in its entirety.

TECHNICAL FIELD

The present technology relates to a solid-state imaging element. Specifically, the present technology relates to a solid-state imaging element, an imaging device, and a solid-state imaging element control method in which signal processing is performed per column.

BACKGROUND ART

In the related solid-state imaging elements, single slope type ADCs (Analog to Digital Converters) equipped with comparators and counters are widely used because a configuration of a single slope type ADC is simpler than that of a successive comparison type ADC. For example, a solid-state imaging element that is equipped with per-column ADCs of a single slope type to capture image data has been proposed (for example, see PTL 1).

CITATION LIST

Patent Literature

[PTL 1]
Japanese Patent Laid-Open No. 2009-124513

SUMMARY

Technical Problems

In the above-mentioned conventional technology, single slope type ADCs which have a simple configuration are used. Accordingly, the circuit scale is reduced, compared to a case where successive comparison type ADCs or the like are used. However, there is a possibility that fixed pattern noise is generated in the above-mentioned solid-state imaging element due to dispersion of analog gains for input signals in the respective per-column ADCs. In particular, when a voltage of a power source of a comparator is lowered in order to reduce power consumption, there arises a problem that fixed pattern noise of a vertical stripe shape is likely to occur.

The present technology has been made in view of the above-mentioned circumstances, and an object thereof is to reduce noise in a solid-state imaging element equipped with per-column ADCs.

Solution to Problems

The present technology has been made in order to solve the above problems. A first aspect of the present technology is a solid-state imaging element and a control method therefor. The solid-state imaging element includes a test signal source that generates a test signal of a predetermined level, an analog-to-digital converter that increases/decreases an analog signal according to an analog gain selected from among a plurality of analog gains, and converts the increased/decreased analog signal to a digital signal, an input switching section that inputs, as the analog signal, either the test signal or a pixel signal to the analog-to-digital converter, a correction value calculation section that, on the basis of the test signal and the digital signal, obtains a correction value for correcting an error in the selected analog gain, and outputs the correction value, and a correction section that corrects the digital signal according to the outputted correction value. Accordingly, an effect of eliminating fixed pattern noise is provided.

In addition, in the first aspect, the analog-to-digital converter may include a comparator that compares the analog signal with a predetermined ramp signal, and outputs a result of the comparison, and a digital signal generation section that generates the digital signal on the basis of the comparison result, and the comparator may include a differential amplification circuit that amplifies a difference between a predetermined reference voltage and a voltage of a predetermined node, and outputs the amplified difference as the comparison result, a vertical signal line-side capacity that is inserted between the predetermined node and the input switching section, a ramp-side capacity that is inserted between the predetermined node and a digital-to-analog converter that generates the ramp signal, and a switch that changes a capacity ratio of the vertical signal line-side capacity and the ramp-side capacity according to a predetermined control signal. Accordingly, an effect of controlling the capacity ratio is provided.

In addition, in the first aspect, the plurality of analog gains may be classified into a plurality of gain domains in which the different capacity ratios are set, the kinds of the level of the test signal may include a high level that corresponds to a pixel signal when an incident light quantity is greater than a predetermined value and a low level that corresponds to a pixel signal when the incident light quantity is not greater than the predetermined value and the test signal source may supply only the high level for each of the plurality of gain domains during a signal level conversion time period for converting a signal level according to a light exposure quantity. Accordingly, an effect of shortening the calibration time period is provided.

In addition, in the first aspect, the plurality of analog gains may be classified into a plurality of gain domains in which the different capacity ratios are set, the kinds of the level of the test signal may include a high level that corresponds to a pixel signal when an incident light quantity is greater than a predetermined value and a low level that corresponds to a pixel signal when the incident light quantity is not greater than the predetermined value, and the test signal source may supply the high level and the low level sequentially for a reference gain domain among the plurality of gain domains during a signal level conversion time period for converting the signal level according to a light exposure quantity, and supply only the high level for the remaining gain domains among the plurality of gain domains during the signal level conversion time period. Accordingly, an effect of shortening the calibration time period, and improving the correction accuracy is provided.

In addition, in the first aspect, the plurality of analog gains may be classified into a plurality of gain domains in which the different capacity ratios are set, and the test signal source may supply the test signals as many as a sampling number that corresponds to an analog gain regarding the corresponding gain domain. Accordingly, an effect of shortening the calibration time period is provided.

In addition, the first aspect may further include a reference data accumulation section that accumulates the digital signals for a reference gain domain among the plurality of gain domains, and outputs a result of the accumulation as a first addition result, and a target domain data accumulation section that accumulates the digital signals for each of the gain domains excluding the reference gain domain among the plurality of gain domains, and outputs a result of the accumulation as a second addition result, in which the correction value calculation section may calculate, as the correction value, a gain correction coefficient for correcting an analog gain on the basis of the first addition result and the second addition result. Accordingly, an effect of correcting the linearity is provided.

In addition, in the first aspect, the correction value calculation section may include a first shift computation section that carries out computation of shifting a predetermined maximum sampling number according to the sampling number in the reference gain domain, a first multiplier that multiplies computation result obtained by the first shift computation section with a first addition result, a second shift computation section that carries out computation of shifting the predetermined maximum sampling number according to the sampling numbers in each of the gain domains excluding the reference gain domain, a second multiplier that multiplies computation result obtained by the second shift computation section with a second addition result, and a divider that divides the multiplication result obtained by the first multiplier, by the multiplication result obtained by the second multiplier, and outputs, as the gain correction coefficient, a result of the division. Accordingly, an effect of computing a gain correction coefficient is provided.

In addition, in the first aspect, the correction value calculation section may include a first multiplier that multiplies the sampling number in each of the gains domains excluding the reference gain domain, with the first addition result, a second multiplier that multiplies the sampling number in the reference gain domain with the second addition result, and a divider that divides the multiplication result obtained by the first multiplier, by the multiplication result obtained by the second multiplier, and outputs, as the gain correction coefficient, a result of the division. Accordingly, an effect of reducing the computation amount is provided.

Moreover, a second aspect of the present technology is an imaging device including a pixel array section in which a plurality of pixels that each generates a pixel signal are arranged, a test signal source that generates a test signal of a predetermined level, an analog-to-digital converter that increases/decreases an analog signal according to an analog gain selected from among a plurality of analog gains, and converts the increased/decreased analog signal to a digital signal, an input switching section that inputs, as the analog signal, either the test signal or the pixel signal to the analog-to-digital converter, a correction value calculation section that, on the basis of the test signal and the digital signal, obtains a correction value for correcting an error in the selected analog gain, and outputs the correction value, and a correction section that corrects the digital signal according to the outputted correction value. An effect of eliminating fixed pattern noise in image data captured by the imaging device is provided.

BRIEF DESCRIPTION OF DRAWINGS

FIG. 13 is a diagram depicting one example of variation of test signals and reference signals according to the first embodiment of the present technology.

FIG. 14 is a diagram depicting one example of variation of test signals and reference signals according to the comparative embodiment.

FIG. 19 is a diagram depicting one example of variation of test signals and reference signals according to the modification of the first embodiment of the present technology.

FIG. 20 is a diagram depicting one example of calibration time periods in respective gain domains according to the second embodiment of the present technology.

DESCRIPTION OF EMBODIMENTS

Hereinafter, embodiments for carrying out the present technology (hereinafter, referred to as embodiments) will be explained. The explanation will be given in the following order.

1. First Embodiment (a test signal source supplies only high-level signals)
2. Second Embodiment (test signals as many as a sampling number corresponding to an analog gain are supplied)
3. Third Embodiment (Linearity correction is performed)
4. Application Examples to Mobile Body 1. First Embodiment

[Configuration Example of Imaging Device]

Figure 1:
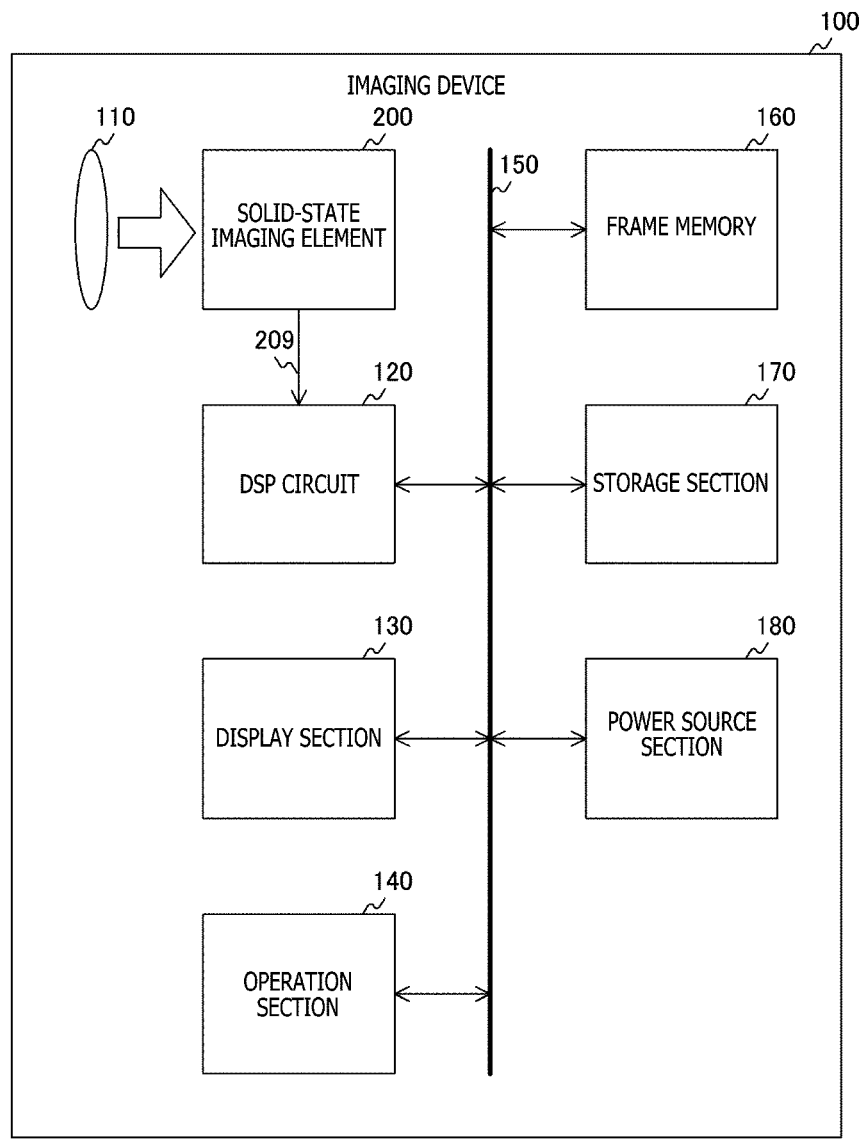
FIG. 1 is a block diagram depicting one configuration example of an imaging device according to a first embodiment of the present technology.

FIG. 1 is a block diagram depicting one configuration example of an imaging device 100 according to a first embodiment of the present technology. The imaging device 100 is a device for capturing image data (frame). The imaging device 100 includes an optical section 110, a solid-state imaging element 200, and a DSP (Digital Signal Processing) circuit 120. The imaging device 100 further includes a display section 130, an operation section 140, a bus 150, a frame memory 160, a storage section 170, and a power source section 180. It is assumed that the imaging device 100 is a digital camera such as a digital still camera, a smartphone or personal computer with an image capturing function, or an on-vehicle camera, for example.

The optical section 110 collects light from a subject and guides the light to the solid-state imaging element 200. The solid-state imaging element 200 performs photoelectric conversion to generate a frame in synchronization with a vertical synchronization signal. Here, the vertical synchronization signal is a cyclic signal of a predetermined frequency indicating an image capturing timing. The solid-state imaging element 200 supplies the generated image data to the DSP circuit 120 via a signal line 209.

The DSP circuit 120 executes predetermined signal processing on the frame supplied from the solid-state imaging element 200. The DSP circuit 120 outputs the processed frame to the frame memory 160, etc., via the bus 150.

The display section 130 is used to display a frame. It is assumed that, for example, a liquid crystal panel or an organic EL (Electro Luminescence) panel is used as the display section 130. The operation section 140 generates an operation signal according to a user's operation.

The bus 150 is a common path for data exchange among the optical section 110, the solid-state imaging element 200, the DSP circuit 120, the display section 130, the operation section 140, the frame memory 160, the storage section 170, and the power source section 180.

The frame memory 160 holds image data. The storage section 170 stores a variety of data such as a frame. The power source section 180 supplies a power source to the solid-state imaging element 200, the DSP circuit 120, the display section 130, etc.

[Configuration Example of Solid-State Imaging Element]

Figure 2:
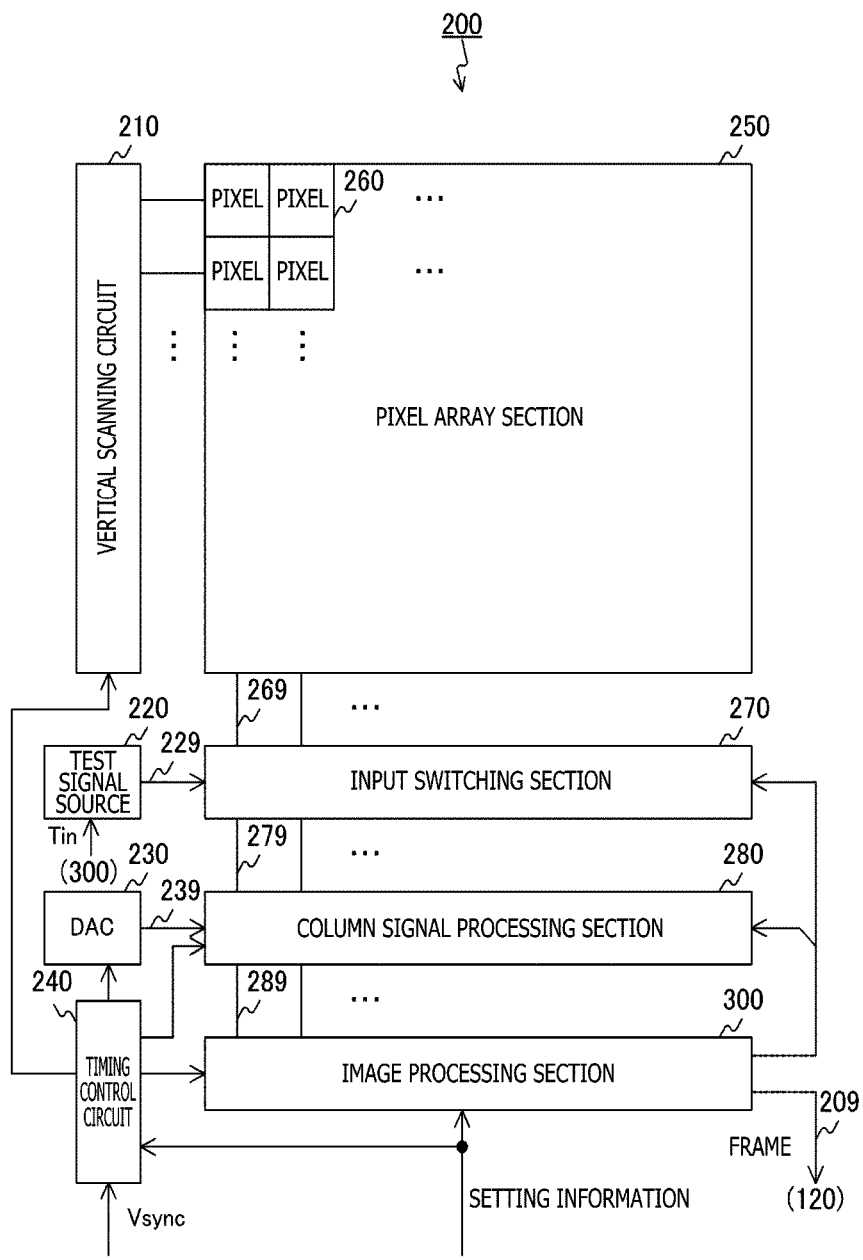
FIG. 2 is a block diagram depicting one configuration example of a solid-state imaging element according to the first embodiment of the present technology.

FIG. 2 is a block diagram depicting one configuration example of the solid-state imaging element 200 according to the first embodiment of the present technology. The solid-state imaging element 200 includes a vertical scanning circuit 210, a test signal source 220, a DAC 230, a timing control circuit 240, a pixel array section 250, an input switching section 270, a column signal processing section 280, and an image processing section 300.

In the pixel array section 250, a plurality of pixels 260 is arranged into a two-dimensional lattice shape. Hereinafter, a set of pixels 260 that are arranged in a predetermined horizontal direction is referred to as a "row," while a set of pixels 260 that are arranged in a direction perpendicular to the horizontal direction is referred to as "column."

The timing control circuit 240 controls operation timings of the vertical scanning circuit 210, the DAC 230, and the column signal processing section 280 in synchronization with a vertical synchronization signal Vsync.

The vertical scanning circuit 210 sequentially selects and drives a row to output analog pixel signals to the input switching section 270.

Each pixel 260 generates a pixel signal by photoelectric conversion, under control of the vertical scanning circuit 210. Each pixel 260 outputs a pixel signal to the column signal processing section 280 via a vertical signal line 269.

The test signal source 220 generates a signal of a predetermined level as a test signal according to a control signal Tin supplied from the image processing section 300, and supplies the test signal to the input switching section 270 via a signal line 229. For example, a correction DAC which is provided separately from the DAC 230 is used as the test signal source 220.

The input switching section 270 selects, in each column, either a test signal or a pixel signal of the column, under control of the image processing section 300. The input switching section 270 supplies, as an input signal, the selected signal to the column signal processing section 280.

The DAC 230 generates a reference signal by DA (Digital to Analog) conversion, and supplies the reference signal to the column signal processing section 280. For example, a saw-tooth shaped ramp signal is used as the reference signal.

The column signal processing section 280 converts, in each column, an analog input signal to a digital signal by using a reference signal. The column signal processing section 280 supplies the digital signal to the image processing section 300.

The image processing section 300 performs predetermined image processing on a frame in which digital signals are arrayed. This image processing includes correction processing for reducing fixed pattern noise. The image processing section 300 supplies the processed frame to the DSP circuit 120.

Further, setting information is inputted from the outside to the timing control circuit 240 and the image processing section 300. For example, the setting information indicates a setting value of an analog gain during image capturing. The setting information is generated by a host computer or the like.

[Configuration Example of Pixel]

Figure 3:
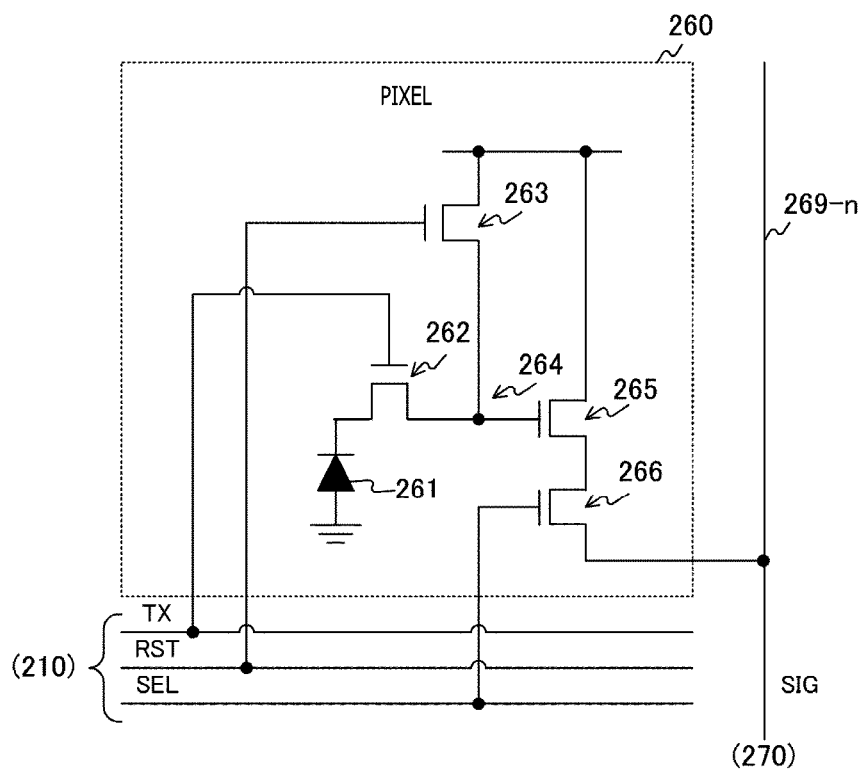
FIG. 3 is a circuit diagram depicting one configuration example of a pixel according to the first embodiment of the present technology.

FIG. 3 is a circuit diagram depicting one configuration example of a pixel 260 according to the first embodiment of the present technology. The pixel 260 includes a photoelectric conversion element 261, a transfer transistor 262, a reset transistor 263, a floating diffusion layer 264, an amplification transistor 265, and a selection transistor 266.

The photoelectric conversion element 261 generates electric charge by photoelectrically converting incident light. The transfer transistor 262 transfers the electric charge from the photoelectric conversion element 261 to the floating diffusion layer 264 according to a transfer signal TX supplied from the vertical scanning circuit 210. The reset transistor 263 initiates the electric charge quantity in the floating diffusion layer 264 according to a reset signal RST supplied from the vertical scanning circuit 210.

The floating diffusion layer 264 accumulates electric charge and generates a voltage corresponding to the electric charge quantity. The amplification transistor 265 amplifies the voltage of the floating diffusion layer 264. The selection transistor 266 outputs, as a pixel signal SIG, a signal of the amplified voltage according to a selection signal SEL supplied from the vertical scanning circuit 210. When the number of columns is defined as N (N is an integer), pixel signals of an n-th (n is an integer of 1 to N) column are transmitted to the input switching section 270 via a vertical signal line 269-n.

It is to be noted that the circuit of the pixel 260 is not limited to the circuit depicted in FIG. 3 as long as the pixel 260 is capable of generating a pixel signal by photoelectric conversion.

[Configuration Example of Input Switching Section]

Figure 4:
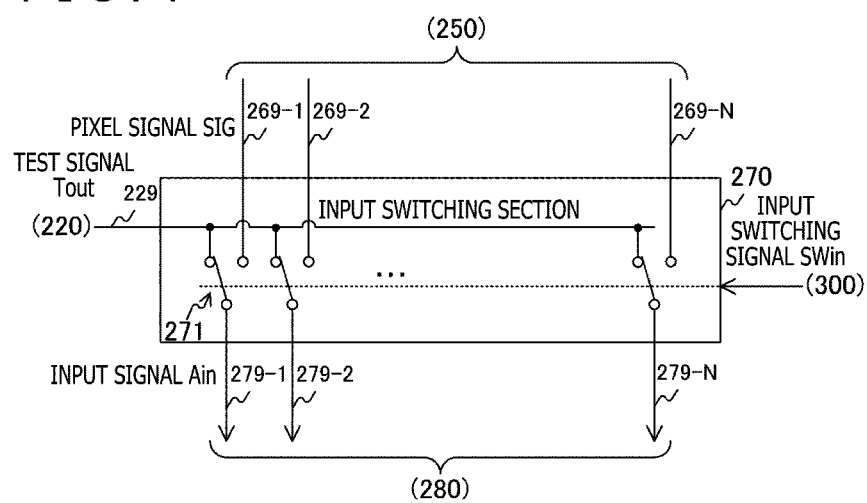
FIG. 4 is a circuit diagram depicting one configuration example of an input switching section according to the first embodiment of the present technology.

FIG. 4 is a circuit diagram depicting one configuration example of the input switching section 270 according to the first embodiment of the present technology. The input switching section 270 includes a plurality of selectors 271. The selectors 271 are disposed for respective columns. In a case where the number of columns is N, N selectors 271 are arranged.

According to an input switching signal SWin supplied from the image processing section 300, each selector 271 selects either a pixel signal SIG of the corresponding column or a test signal Tout supplied from the test signal source 220. One of two input terminals of the selector 271 of the n-th column is connected to the pixel array section 250 via the vertical signal line 269-n, and the other input terminal is connected to the test signal source 220 via the signal line 229. In addition, an output terminal of the selector 271 of the n-th column is connected to the column signal processing section 280 via a signal line 279-n. The selector 271 outputs the selected signal as an input signal Ain.

[Configuration Example of Column Signal Processing Section]

Figure 5:
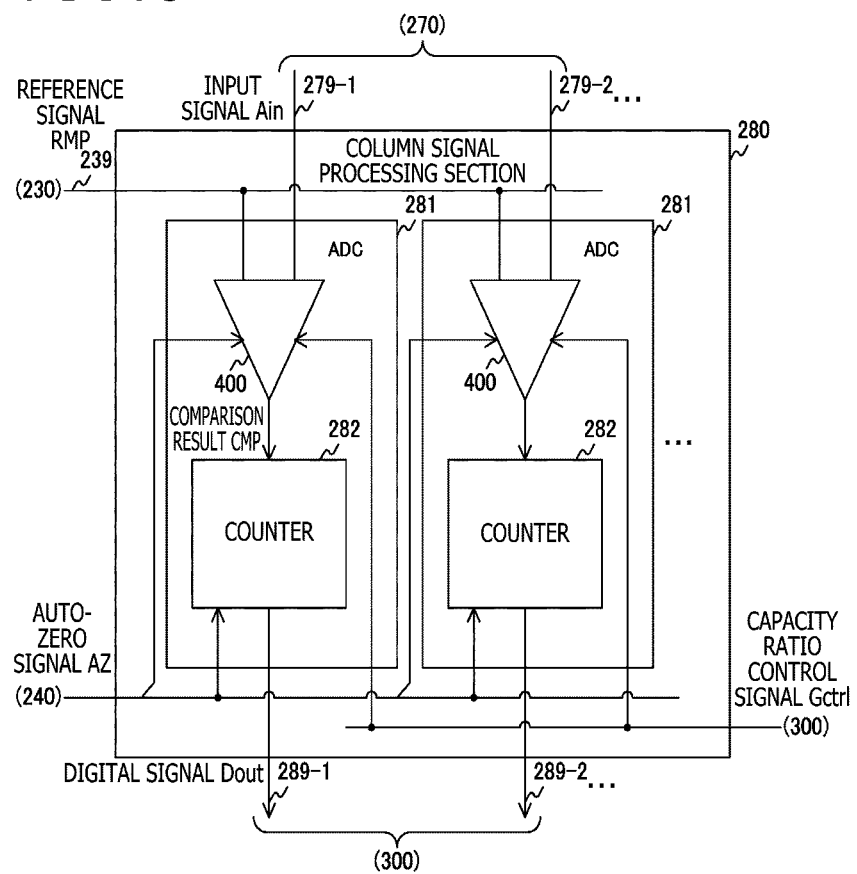
FIG. 5 is a block diagram depicting one configuration example of a column signal processing section according to the first embodiment of the present technology.

FIG. 5 is a block diagram depicting one configuration example of the column signal processing section 280 according to the first embodiment of the present technology. The column signal processing section 280 includes a plurality of ADCs 281. The ADCs 281 are provided per column. In a case where the number of columns is N, N ADCs 281 are arranged.

The ADCs 281 each convert an analog input signal Ain of the corresponding column to a digital signal Dout. Each of the ADCs 281 includes a comparator 400 and a counter 282.

The comparator 400 compares the reference signal RMP and the input signal Ain of the corresponding column. The comparator 400 supplies a comparison result CMP to the counter 282. Further, an auto-zero signal AZ supplied from the timing control circuit 240 and a capacity ratio control signal Gctrl supplied from the image processing section 300 are inputted to the comparator 400. Here, the capacity ratio control signal Gctrl is supplied for controlling an analog gain of the ADC 281 by switching the capacity ratio.

The counter 282 obtains a count value, under control of the timing control circuit 240 until the comparison result CMP is inverted. The counter 282 supplies, as a digital signal Dout, a signal indicating the count value to the image processing section 300. It is to be noted that the counter 282 is one example of the digital signal generation section set forth in the claims.

Here, the kinds of the level of a pixel signal include a P-phase level and a D-phase level. The P-phase level is obtained when the pixel 260 is initialized. The D-phase level corresponds to an exposure quantity when electric charge is transferred to the floating diffusion layer 264 in the pixel 260. The kinds of the AD conversion time period of an input signal Ain include a P-phase time period for AD conversion of the P-phase level and a D-phase time period for AD conversion of the D-phase level. It is to be noted that the P-phase level is one example of the reset level set forth in the claims, and the D-phase level is one example of the signal level set forth in the claims. Further, the D-phase time period is one example of the signal level conversion time period set forth in the claims.

Under control of the timing control circuit 240, the counter 282 carries out down/up counting (for example, down counting) during the P-phase time period, and carries out the other counting (for example, up counting) during the D-phase time period. As a result, CDS (Correlated Double Sampling) processing for obtaining a difference between the P-phase level and the D-phase level can be implemented.

It is to be noted that the counter 282 performs CDS processing by carrying out both the up counting and down counting. However, the counter 282 may carry out only one of up counting and down counting. In this case, a CDS processing circuit that performs CDS processing is added to a poststage of the counter 282.

The ADC 281 in which AD conversion is performed by the comparator 400 and the counter 282, as depicted in FIG. 5, is called a single slope type ADC.

It is to be noted that an ADC (e.g., successive comparison type ADC) that is not a single slope type may be provided as the ADC 281 as long as the ADC performs AD conversion using the comparator 400. In a case where a successive comparison type ADC is disposed, an SAR (Successive Approximation Register) logic circuit and a register are provided in place of the counter 282. The SAR logic circuit obtains the value of a reference signal that is approximated to an input signal on the basis of a comparison result CMP, and generates a DAC control signal for updating a reference signal to the obtained value. The register holds the DAC control signal and a digital signal in which the comparison results are arranged, and outputs the DAC control signal to the DAC 230 while outputting the digital signal to the image processing section 300.

[Configuration Example of Comparator]

Figure 6:
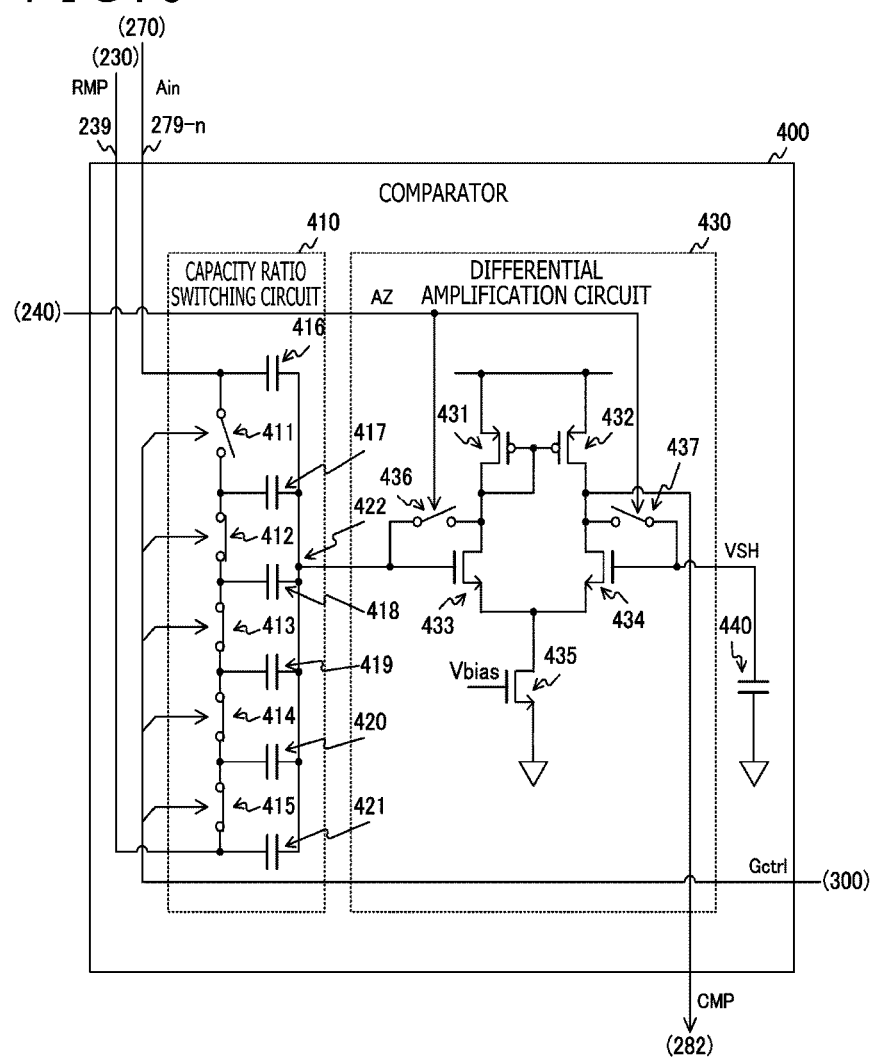
FIG. 6 is a circuit diagram depicting one configuration example of a comparator according to the first embodiment of the present technology.

FIG. 6 is a circuit diagram depicting one configuration example of the comparator 400 according to the first embodiment of the present technology. A capacity ratio switching circuit 410 and a differential amplification circuit 430 are disposed in the comparator 400. The capacity ratio switching circuit 410 includes a predetermined number of switches including switches 411 to 415 and a plurality of capacities including capacities 416 to 421.

Respective one ends of the capacities 416 to 421 are all connected to a node 422. The other end of the capacity 416 is connected to the input switching section 270 via the signal line 279-n. The other end of the capacity 421 is connected to the DAC 230 via a signal line 239.

The switch 411 opens/closes a path between the other end of the capacity 416 and the other end of the capacity 417 according to a capacity ratio control signal Gctrl. The switch 412 opens/closes a path between the other end of the capacity 417 and the other end of the capacity 418 according to the capacity ratio control signal Gctrl. The switch 413 opens/closes a path between the other end of the capacity 418 and the other end of the capacity 419 according to the capacity ratio control signal Gctrl. The switch 414 opens/closes a path between the other end of the capacity 419 and the other end of the capacity 420 according to the capacity ratio control signal Gctrl. The switch 415 opens/closes a path between the other end of the capacity 420 and the other end of the capacity 421 according to the capacity ratio control signal Gctrl.

According to the capacity ratio control signal Gctrl, the image processing section 300 performs control to make any one of the switches 411 to 415 open and make the remaining switches closed. As a result of this control, the capacity ratio between a vertical signal line-side combined capacity of the capacities that are inserted between the signal line 279-n and the node 422 and a ramp signal-side combined capacity of the capacities that are inserted between the signal line 239 and the node 422 is changed. Hereinafter, the vertical signal line-side combined capacity and the ramp signal-side combined capacity are referred to as "VSL-side capacity" and "ramp-side capacity," respectively. In FIG. 6, by controlling the five switches, the image processing section 300 can switch the capacity ratio among five stages.

It is to be noted that the capacity ratio can be switched among five stages but the image processing section 300 may switch the capacity ratio among multiple stages other than five stages. When the number of the stages is defined as M (M is an integer), M switches and M+1 capacities are provided in the capacity ratio switching circuit 410.

In addition, the capacity 416 has the highest capacity value while the capacity values of the capacities 417 to 421 are set to be equal to one another. It is to be noted that the capacity value of each of the capacities 416 to 421 may be set to any value.

The capacity 440 holds a predetermined reference voltage VSH.

The differential amplification circuit 430 amplifies the difference between the voltage of the node 422 and the reference voltage VSH. The differential amplification circuit 430 includes pMOS transistors 431 and 432, auto-zero switches 436 and 437, and nMOS transistors 433 to 435.

The pMOS transistors 431 and 432 are connected in parallel to a power source. The gate of the pMOS transistor 431 is connected to the drain of the pMOS transistor 431 and the gate of the pMOS transistor 432.

The drain of the nMOS transistor 433 is connected to the pMOS transistor 431, and the source of the nMOS transistor 433 is connected to a common node. Further, the gate of the nMOS transistor 433 is connected to the node 422. The drain of the nMOS transistor 434 is connected to the pMOS transistor 432, and the source of the nMOS transistor 434 is connected to the common node. Further, the gate of the nMOS transistor 434 is connected to the capacity 440.

The nMOS transistor 435 is inserted between the common node and a grounded terminal. A predetermined bias voltage Vbias is inputted to the gate of the nMOS transistor 435.

The auto-zero switch 436 makes a short circuit between the drain and the gate of the nMOS transistor 433 according to an auto-zero signal AZ supplied from the timing control circuit 240. The auto-zero switch 437 makes a short circuit between the drain and the gate of the nMOS transistor 434 according to the auto-zero signal AZ.

In addition, from a connection point between the pMOS transistor 432 and the nMOS transistor 434, a comparison result CMP is outputted to the counter 282.

Figure 7:
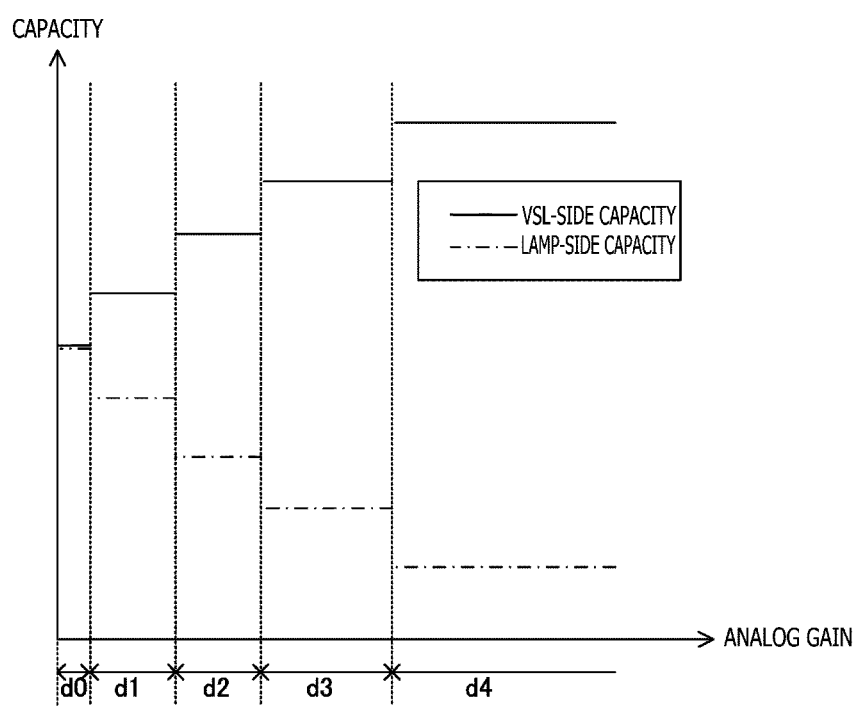
FIG. 7 is a diagram depicting one example of a VSL (Vertical Signal Line)-side capacity and a ramp-side capacity for each gain domain according to the first embodiment of the present technology.

FIG. 7 is a diagram depicting one example of the VSL-side capacity and the ramp-side capacity for each gain domain according to the first embodiment of the present technology.

Here, the analog gain by the ADC 281 can be controlled according to the inclination of the slope of a reference signal RMP (ramp signal) and the capacity ratio between the VSL-side capacity and the ramp-side capacity. When the inclination of the slope is moderated, the analog gain becomes higher. Further, the analog gain is increased/decreased according to the capacity ratio. In a case where the inclination of the slope is controlled in K (K is an integer) stages and the capacity ratio is controlled in M stages, K×M stages of analog gains can be realized. The K×M analog gains are classified into M groups in which the different capacity ratios are set. Hereinafter, each of the groups is referred to as "gain domain." For example, in a case where the capacity ratio can be switched among five stages, the analog gains can be classified into five gain domains d0 to d4. In each gain domain, the capacity ratio is set be fixed, and an analog gain is controlled in multiple stages according to the inclination of the slope. A host computer measures a light quantity of environmental light, for example, and sets a lower analog gain when the measured light quantity is higher.

In FIG. 7, the vertical axis indicates the VSL-side capacity or the ramp-side capacity, while the horizontal axis indicates the analog gain. In the gain domain d0, the VSL-side capacity is equal to the ramp-side capacity. In the gain domains d1 to d4, the VSL-side capacity is higher than the ramp-side capacity. When the VSL-side capacity is higher, the analog gain is higher.

[Configuration Example of Image Processing Section]

Figure 8:
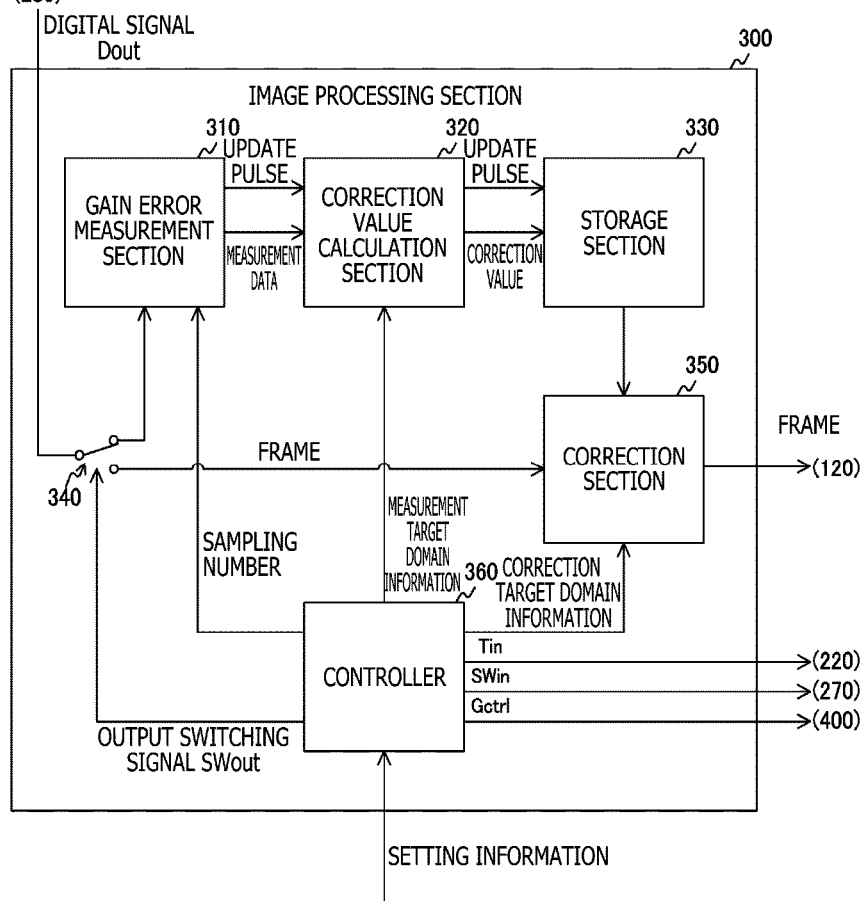
FIG. 8 is a block diagram depicting one configuration example of an image processing section according to the first embodiment of the present technology.

FIG. 8 is a block diagram depicting one configuration example of the image processing section 300 according to the first embodiment of the present technology. The image processing section 300 includes a gain error measurement section 310, a correction value calculation section 320, a storage section 330, a selector 340, a correction section 350, and a controller 360.

The selector 340 outputs a digital signal Dout supplied from the column signal processing section 280 to either the gain error measurement section 310 or the correction section 350 according to an output switching signal SWout supplied from the controller 360.

From the digital signal supplied from the selector 340, the gain error measurement section 310 measures a parameter indicating an error in an analog gain. Here, in a case where the ADCs 281 are provided per column, an analog gain error may occur in each of the ADCs 281. Further, different errors are likely to occur in the columns. Such relative gain errors in the columns may cause fixed pattern noise. An analog gain error is caused by a production variation of analog circuits in the comparator 400 or aging deterioration of these analog circuits, for example. Therefore, the gain error measurement section 310 measures a luminance level error multiple times in each column and in each gain domain in order to make analog gains uniform, and obtains relative gain errors in the columns on the basis of the luminance level errors. The number of times of performing AD conversion for obtaining an analog gain is set as a sampling number on the basis of setting information supplied from a host computer. Then, the gain error measurement section 310 supplies, as measurement data, the obtained error to the correction value calculation section 320.

In addition, the gain error measurement section 310 generates an update pulse on the basis of the sampling number supplied from the controller 360, and supplies the update pulse and the measurement data to the correction value calculation section 320. The update pulse is a signal for indicating a timing for updating a correction value.

The correction value calculation section 320 obtains a correction value for correcting an analog gain error in each column and in each gain domain on the basis of the measurement data. Here, the correction values include the value of a gain correction coefficient "a" for collecting an analog gain error and an offset correction coefficient "b" for correcting an offset error. In a case where the number of columns and the number of gain domains are N and M, respectively, N×M×2 correction values are obtained.

The correction value calculation section 320 stores the obtained correction values (the gain correction coefficient and the offset correction coefficient) into the storage section 330. In addition, measurement target domain information indicating a gain domain that is a measurement target for the gain error measurement section 310 is inputted to the correction value calculation section 320. The correction value calculation section 320 updates the correction value for the gain domain indicated by the measurement target gain domain information in synchronization with the update pulse.

The storage section 330 stores the correction value for each column and for each gain domain.

The correction section 350 corrects the digital signal supplied from the selector 340 according to the correction value. Correction target domain information indicating a gain domain that is a correction target is inputted to the correction section 350 by the controller 360. In a case where digital signals Dout of the n-the column are inputted and the correction target domain information indicates m (m is an integer of 0 to M−1), the correction section 350 reads out, from the storage section 330, a gain correction coefficient "a" and an offset correction coefficient "b" for the n-th column and the m-th gain domain. Then, the digital signal Dout is corrected according to the following expression.

$$Dout'=Dout \times a+b \qquad \text{Expression 1}$$

In the expression, Dout' represents a corrected digital signal.

The correction section 350 supplies image data (frame) in which the digital signals Dout' obtained from Expression 1 are arranged, to the DSP circuit 120.

The controller 360 performs control concerning image processing. Before a video time period for generating a frame is started, the controller 360 first performs a start-time process for computing a correction value. During the start-time process, by using an input switching signal SWin, the controller 360 controls the input switching section 270 to input a test signal. In addition, by using an output switching signal SWout, the controller 360 controls the selector 340 to output a digital signal to the gain error measurement section 310. In addition, by using a capacity ratio control signal Gctrl, the controller 360 controls the comparator 400 to sequentially switch the M gain domains. In addition, the controller 360 causes the correction value calculation section 320 to sequentially compute respective correction values for the M gain domains according to measurement target domain information.

Next, during a vertical blanking time period, the controller 360 performs a divisional process of divisionally performing the processes of the start-time process. In the divisional process, the controller 360 causes input of a test signal by using the input switching signal SWin, and causes output of a digital signal to the gain error measurement section 310 by using the output switching signal SWout. In addition, by using the capacity ratio control signal Gctrl, the controller 360 controls the comparator 400 to perform switching to any one of the M gain domains. In addition, by using the measurement target domain information, the controller 360 causes the correction value calculation section 320 to compute a correction value for the one of the M gain domains.

Then, during the video time period, the controller 360 causes input of a pixel signal by using the input switching signal SWin, and controls the selector 340 to output a digital signal to the correction section 350 by using an output switching signal SWout. In addition, by using the capacity ratio control signal Gctrl, the controller 360 causes switching to a gain domain corresponding to an analog gain indicated by setting information. In addition, by using the correction target domain information, the controller 360 causes correction of the digital signal according to the correction value for the gain domain corresponding to the analog gain indicated by the setting information.

In the start-time process and the divisional process, the controller 360 supplies a sampling number indicated by the setting information, to the gain error measurement section 310, and controls the test signal source 220 to generate test signals as many as the sampling number by using a control signal Tin.

As previously explained, the setting information includes an analog gain that is set during the video time signal, and the sampling number in the start-time process and the sampling number in the divisional process. Hereinafter, the sampling number in the start-time process is referred to as "total sampling number," and the sampling number in the divisional process is referred to as "division sampling number."

Figure 9A:
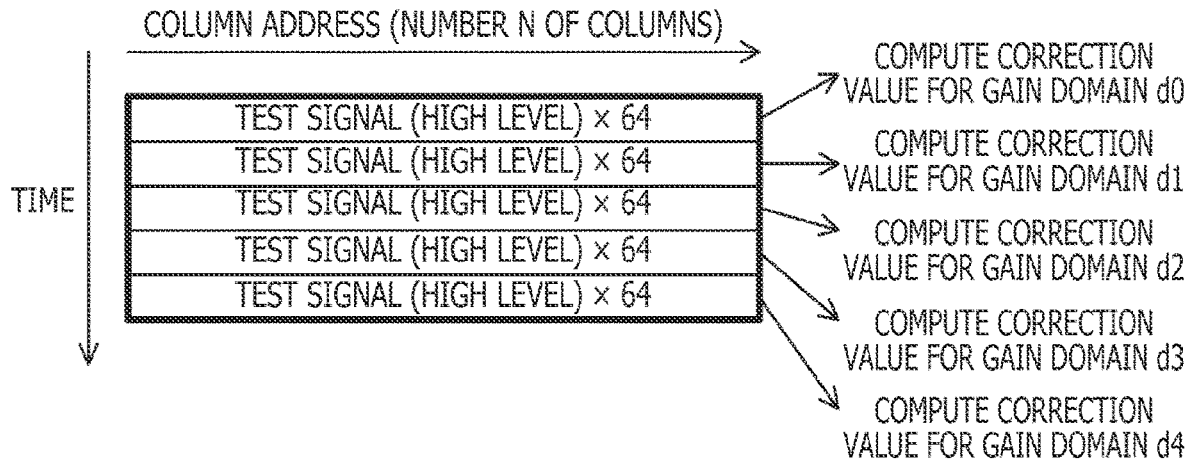
FIGS. 9A and 9B depict one example of diagrams of test signals and a frame according to the first embodiment of the present technology.
Figure 9B:
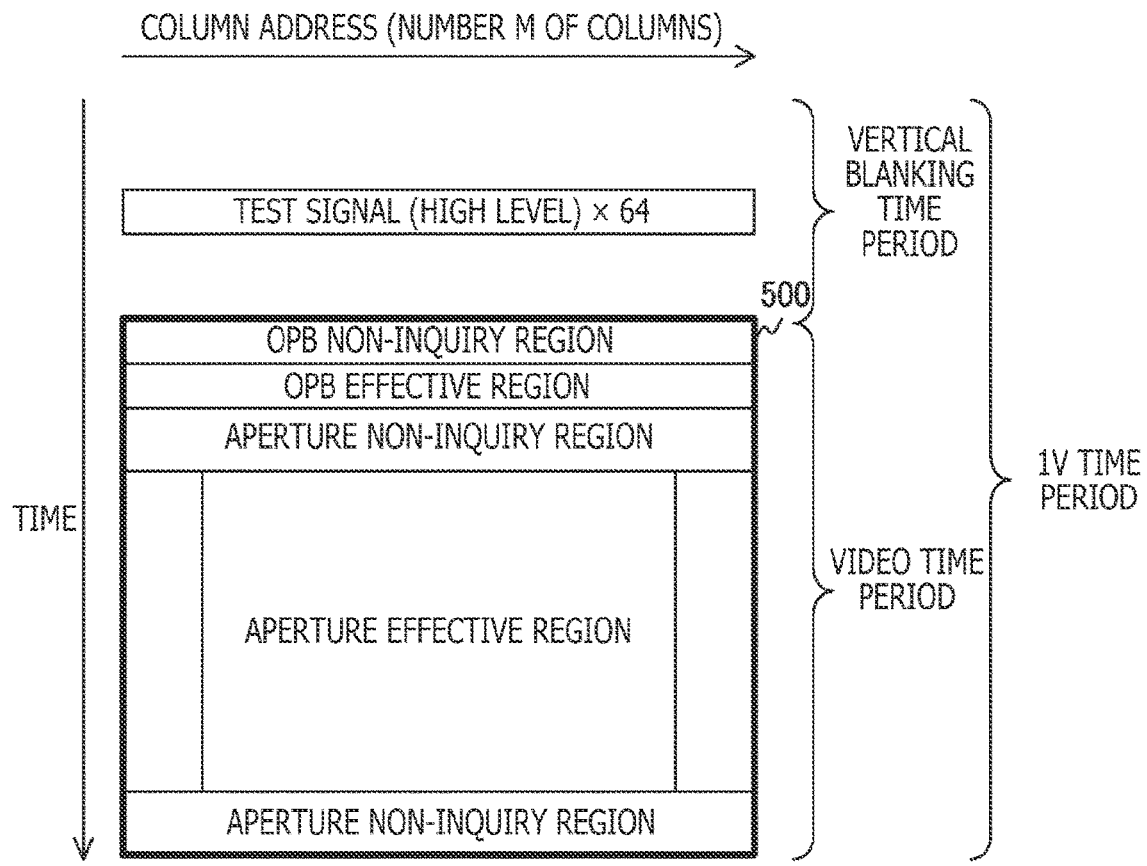

FIGS. 9A and 9B depict one example of diagrams of test signals and a frame according to the first embodiment of the present technology. FIG. 9A depicts one example of test signals that are supplied in the start-time process. FIG. 9B depicts one example of a frame and test signals that are supplied in the divisional process. In FIGS. 9A and 9B, each horizontal axis indicates a column address while each vertical axis indicates a time.

The kinds of the level of a test signal include a "high level" and a "low level." The high level corresponds to a pixel signal when the incident light quantity is greater than a predetermined value. The low level corresponds to a pixel signal when the incident light quantity is not greater than the predetermined value. For example, a black level is set as the low level. In a case where electrons are accumulated as electric charge in the pixel 260, a signal level is lower when the incident light quantity is larger, so that the high level becomes a minus value which is lower than the low level. On the other hand, in a case where positive holes are accumulated, the high level is higher than the low level.

As depicted in FIG. 9A, in the start-time process, the test signal source 220 supplies a predetermined number (e.g., 64) of high-level test signals for each of the plurality of gain domains d0 to d4 to all the columns during the D-phase time period. During the D-phase time period, only high-level test signals are supplied while no low-level test signal is supplied. The number of the supplied test signals corresponds to a sampling number.

In addition, as depicted in FIG. 9B, a 1V time period which is a cycle of a vertical synchronization signal includes the video time period and the vertical blanking time period. During the video time period, a frame 500 is generated. During the vertical blanking time period, no frame 500 is generated.

The frame 500 includes an OPB (Optical Black) non-inquiry region, an OPB effective region, an aperture non-inquiry region, and an aperture effective region.

During the vertical blanking time period, the controller 360 performs the divisional process. Here, the test signal source 220 supplies a predetermined number of high-level test signals for a measurement target gain domain to all the columns during the D-phase time period. During the D-phase time period, only high-level signals are supplied while no low-level signal is supplied.

As depicted in FIGS. 9A and 9B, the test signal source 220 supplies only high-level signals during the D-phase time period. In contrast, a comparative embodiment in which the test signal source 220 supplies both high-level and low-level signals for each gain domain during the D-phase time period is assumed.

Figure 10A:
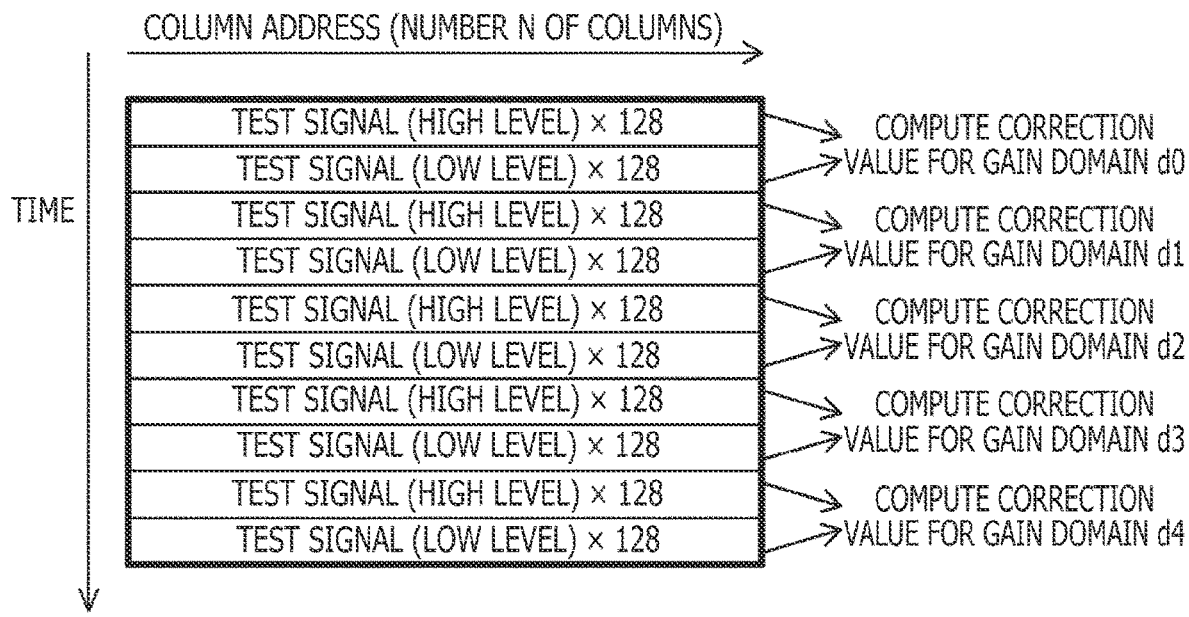
FIGS. 10A and 10B depict one example of diagrams of test signals and a frame according to a comparative embodiment.
Figure 10B:
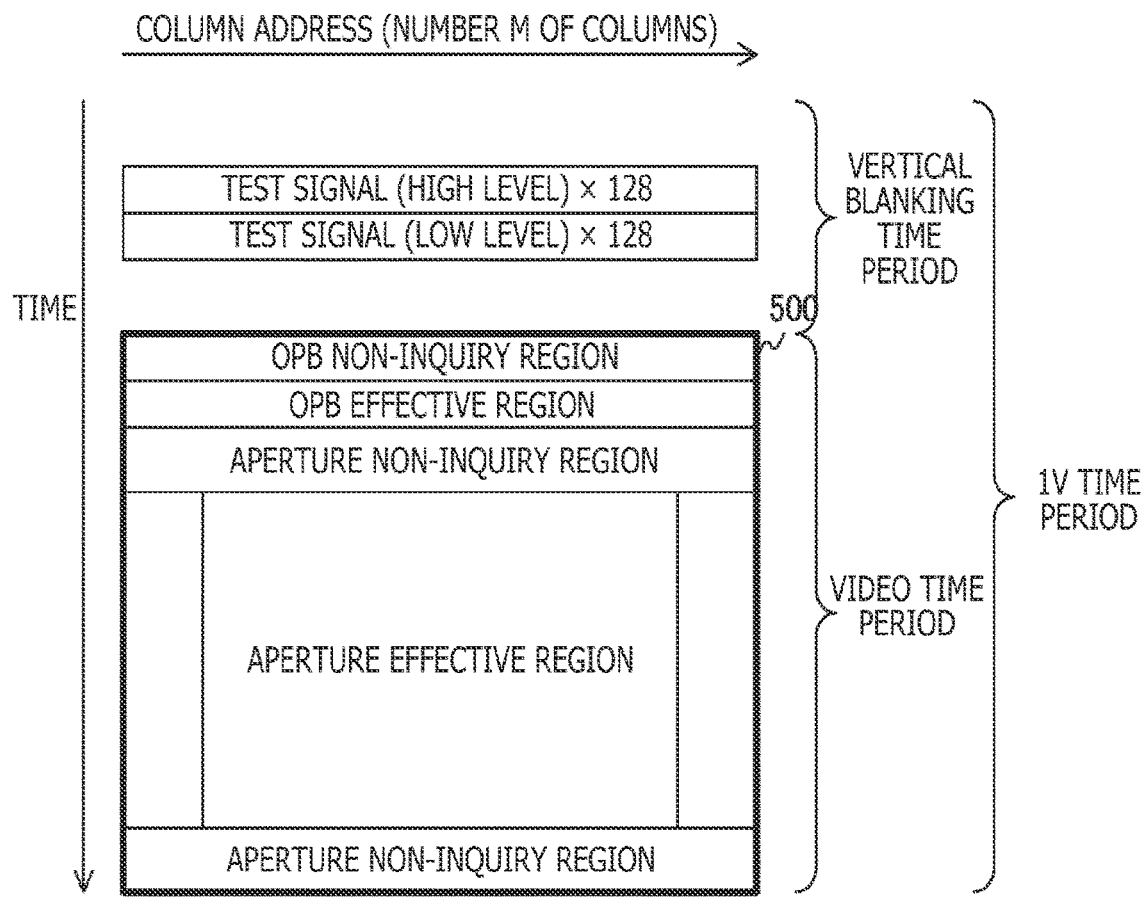

FIGS. 10A and 10B depict one example of diagrams of test signals and a frame according to the comparative embodiment. FIG. 10A depicts one example of test signals that are supplied in the start-time process according to the comparative embodiment. FIG. 10B depicts one example of a frame and test signals that are supplied in the divisional process according to the comparative embodiment. In FIGS. 10A and 10B, each horizontal axis indicates a column address while each vertical axis indicates a time.

As depicted in FIG. 10A, in the start-time period, the test signal source 220 supplies a predetermined number (e.g., 128) of high-level signals and a predetermined number of low-level signals for each of the plurality of gain domains d0 to d4 to all the columns during the D-phase time period.

In addition, as depicted in FIG. 10B, in the vertical blanking time period, the test signal source 220 supplies a predetermined number of high-level signals and a predetermined number of low-level signals for a measurement target gain domain to all the columns during the D-phase time period.

In a configuration in which the test signal source 220 supplies high-level signals and low-level signals for each domain as depicted in FIGS. 10A and 10B, the time period of a calibration for computing a correction value becomes longer with an increase of the number of gain domains. In addition, in the comparative embodiment, a required sampling number is greater, compared to a case where only high-level signals are supplied. For example, when the sampling number for each level in each gain domain is set to "128" and the number of gain domains is M, 128×M×2 is seta as the total sampling number.

In contrast, in a configuration in which the test signal source 220 supplies only high-level signals for each gain domain, variation of low-level signals is not needed to be taken into consideration. Therefore, the sampling number in each gain domain can be made less than that in the comparative embodiment. For example, when the sampling number in each gain domain is set to "64" and the number of gain domains is M, 64×M is set as the total sampling number. As depicted in FIGS. 10A and 10B, as a result of reduction in the sampling number, the calibration time period can be shortened.

Figure 11A:
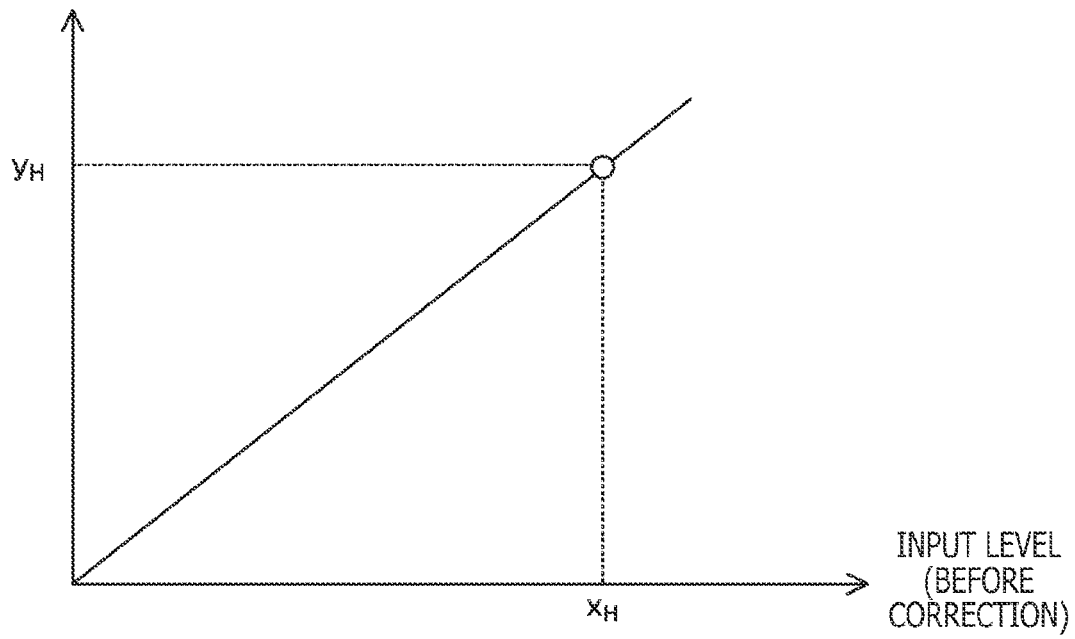
FIGS. 11A and 11B depict one example of graphs of a relation between an input level and an output level in the first embodiment of the present technology, and a graph depicting the relation in the comparative embodiment.
Figure 11B:
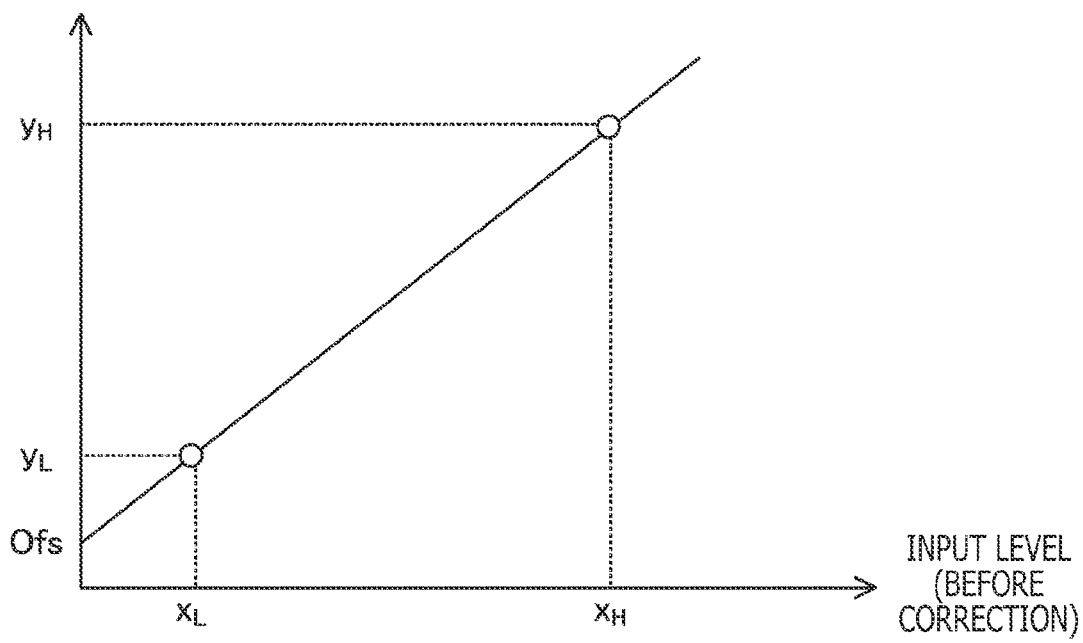

FIGS. 11A and 11B depict one example of graphs of a relation between an input level and an output level in the first embodiment of the present technology and the comparative embodiment. FIG. 11A depicts one example of a graph indicating the relation between an input level and an output level in the first embodiment of the present technology. FIG. 11B depicts one example of a graph indicating the relation between an input level and an output level in the comparative embodiment. In FIGS. 11A and 11B, each vertical axis indicates the level (i.e., output level) of a digital signal Dout. In FIGS. 11A and 11B, each horizontal axis indicates the absolute value of the level (i.e., input level) of an input signal Ain before correction.

The high level of an input signal Ain is defined as xH, while an output level converted from the high level xH is defined as yH. The gain error measurement section 310 computes yH/xH as an analog gain g for each column and each gain domain. In FIG. 11A, the inclination of the straight line corresponds to the analog gain g (=yH/xH).

In a case where the sampling number is 2 or greater, the gain error measurement section 310 obtains a statistical amount STg (the average, the sum, or the like) of analog gains g for each column and each gain domain, and supplies the statistical amount STg as measurement data to the correction value calculation section 320. The statistical amount STg for the m-th gain domain in the n-th column is defined as $STg_{cn\_dm}$.

Further, the correction value calculation section 320 computes, as a target value AVGg, the average value of the statical amounts $STg_{cn\_dm}$ for the gain domain d0 in all the columns. Then, the correction value calculation section 320 computes $AVGg/STg_{cn\_dm}$ as a gain correction coefficient "a" for each column. Also for the gain domain d1 or later, the gain coefficient "a" for each column is computed in the same manner.

On the other hand, in the comparative embodiment, a segment of a straight line in FIG. 11B is computed, as an offset Ofs, together with an analog gain g.

As depicted in FIG. 11A, in a case where the test signal source 220 supplies only high-level signals, dispersion of analog gains (inclinations) is indicated by the following expression.

$$\{1/(xH-xL)\} \cdot \{\sigma RN/(SH)^{1/2}\} \qquad \text{Expression 2}$$

In this expression, σRN represents a standard deviation of dispersion of output levels, and indicates random noise, and SH represents a sampling number for a high-level signal.

Figure 15A:
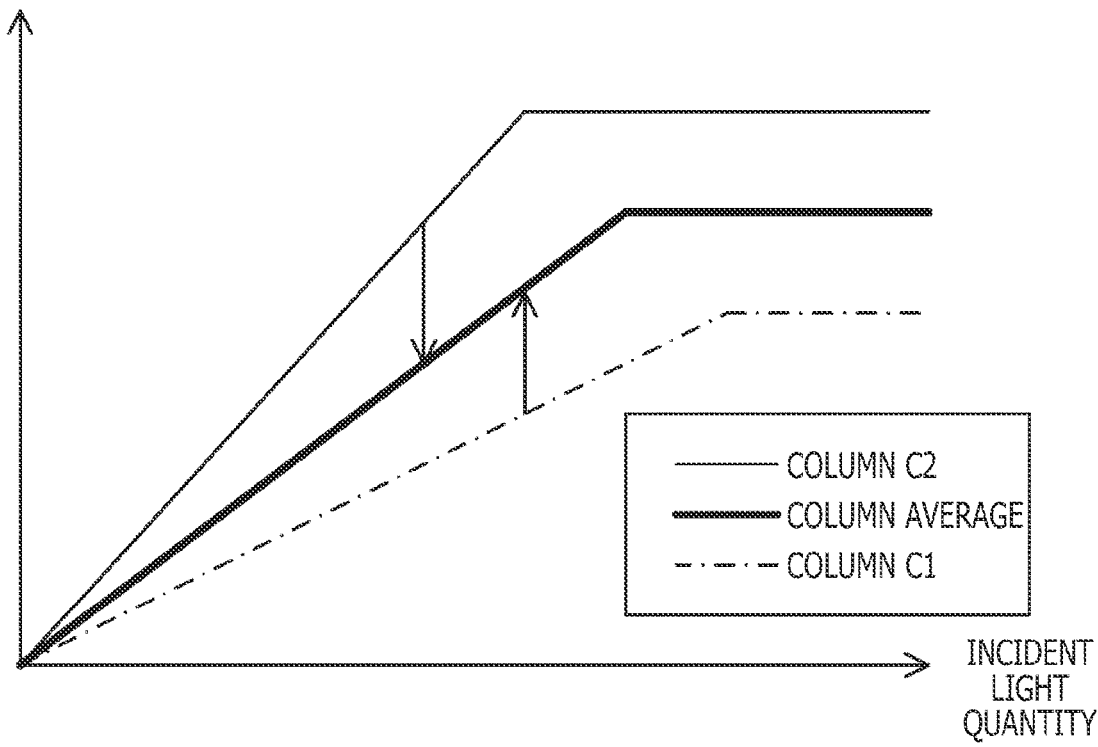
FIGS. 15A and 15B depict diagrams for an analog gain error correction method according to the first embodiment of the present technology.
Figure 15B:
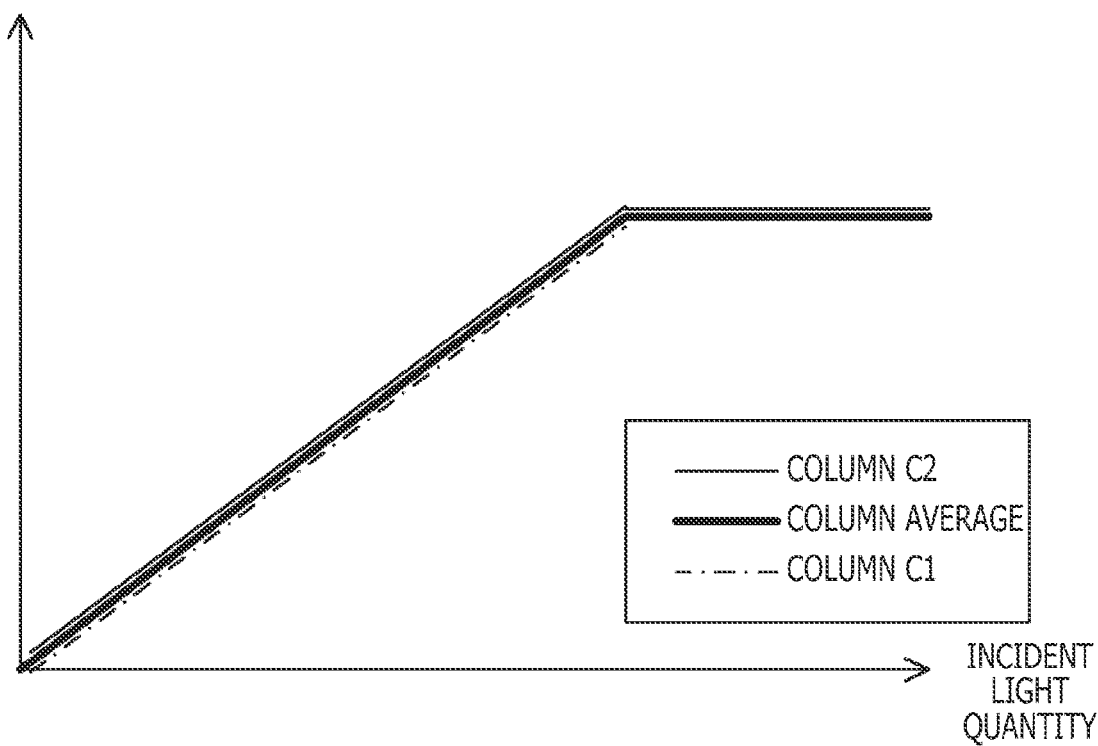

On the other hand, as depicted in b-of-FIG. 15B, in a case where the test signal source 220 supplies high-level and low-level signals, dispersion of analog gains is expressed by the following expression.

$$\{1/(xH-xL)\}\cdot\{\sigma RN/(SHL/4)^{1/2}\} \quad \text{Expression 3}$$

In the expression, xL represents the low level of an input signal Ain, and SHL represents the sampling number for each of the high level and the low level.

When the value obtained by Expression 2 is equal to the value obtained by Expression 3, the following expression is established.

$$S_H = S_{HL}/4 \quad \text{Expression 4}$$

According to Expression 4, in a case where only high-level signals are supplied, a sampling number that is required to eliminate the dispersion to obtain the substantially same correction accuracy becomes less. The sampling number in this case is ¼ of that in a case where high-level and low-level signals are supplied.

Consequently, when the test signal source 220 supplies only high-level signals, the number of levels of test signals is reduced to be ½, a sampling number is reduced to ¼, and the calibration time period can be shortened. As a result, a time period required for the start-time process can be shortened. In addition, a time period required for the divisional process in the vertical blanking time period can be shortened, so that the frame rate is improved.

Figure 12:
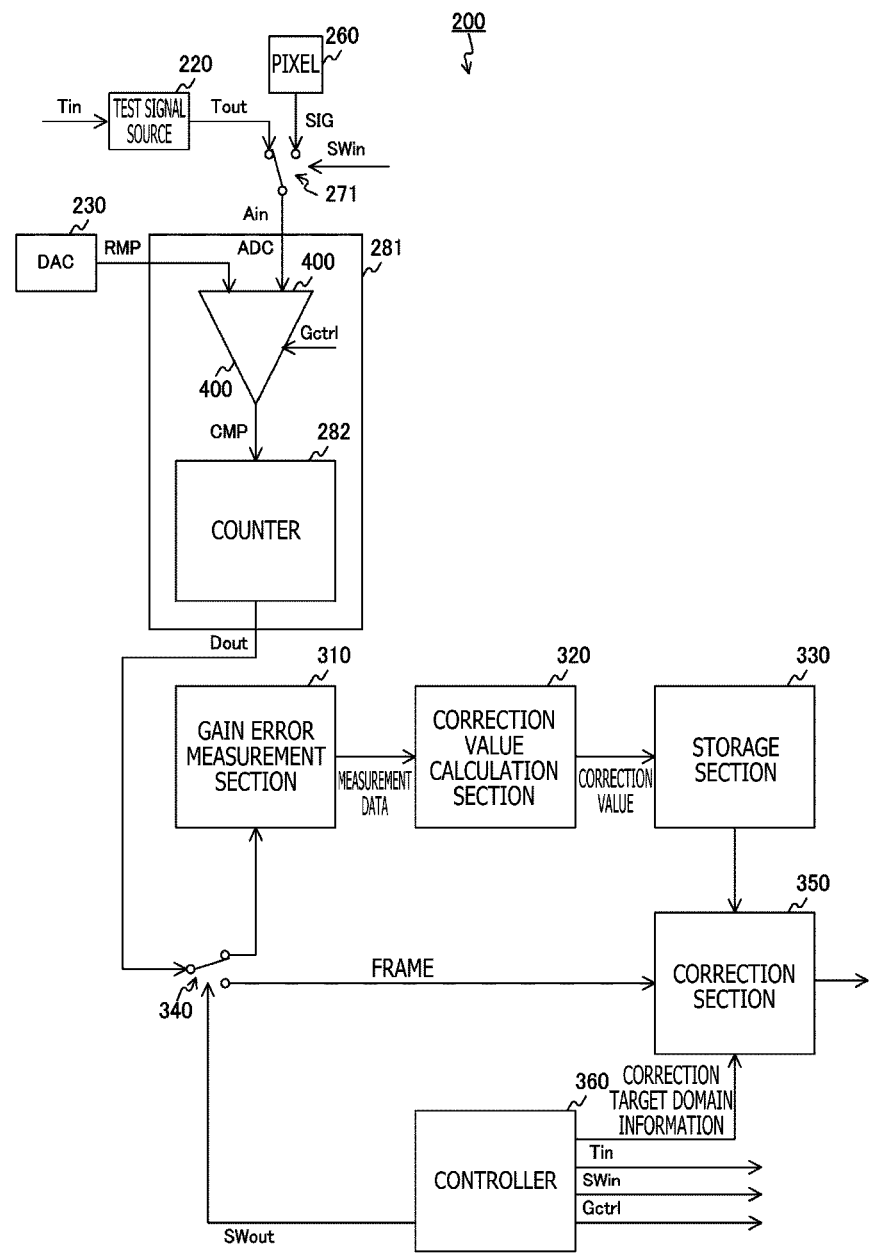
FIG. 12 is a diagram for explaining an error correction method according to the first embodiment of the present technology.

FIG. 12 is a diagram for explaining an error correction method according to the first embodiment of the present technology. The pixel 260 generates a pixel signal SIG. For each gain domain, the test signal source 220 generates test signals Tout of a predetermined level (high level) during the D-phase time period.

The selectors 271 in the input switching section 270 each select either a test signal Tout or a pixel signal SIG of the corresponding column according to an input switching signal SWin, and supplies the selected signal as an input signal Ain to the ADC 281 of the corresponding column.

The ADC 281 converts the analog input signal Ain into a digital signal Dout by an analog gain selected from among a plurality of analog gains according to a capacity ratio control signal Gctrl.

The selector 340 selects either the gain error measurement section 310 or the correction section 350 as an output destination according to an output switching signal SWout, and outputs the digital signal Dout to the output destination.

The gain error measurement section 310 measures an analog gain and an offset in each column and in each gain domain in order to correct an analog gain error and an offset error, and supplies the analog gain and offset as measurement data to the correction value calculation section 320.

On the basis of the relation between the test signal Tout (input) and the digital signal Dout (output), the correction value calculation section 320 obtains a correction value for correcting the analog gain error or the like in each column and in each gain domain, and outputs the correction value to the storage section 330.

Then, the correction section 350 corrects the digital signal Dout according to the outputted correction value. As a result of the correction, fixed pattern noise of a vertical stripe shape which is caused by dispersion of analog gains in each column can be eliminated.

In addition, the controller 360 performs the start-time process of selecting a plurality of gain domains one by one prior to the video time period. Then, the controller 360 performs the divisional process of changing a measurement target gain domain in the vertical blanking time period each time a predetermined number of frames are generated.

FIG. 13 is a diagram depicting one example of variation of test signals and reference signals according to the first embodiment of the present technology. In a time period from timing T0 to T1 prior to the video time period, the test signal source 220 supplies a high-level signal as many times (e.g., 128 times) as the sampling number during the D-phase time period, under control of the controller 360. In the period, the correction value of the gain domain d0 is computed.

The test signal source 220 outputs low-level signals during the P-phase time period from timing T0 to t1 of the time period from timing T0 to T1, and outputs a high-level signal during the D-phase time period from timing t1 to t2. Next, the test signal source 220 outputs a low-level signal during the P-phase time period from timing t2 to t3, and outputs a high-level signal during the D-phase time period from timing t3 to t4. Thereafter, the same control is repeatedly performed until timing T1.

Meanwhile, the DAC 230 generates a saw-tooth shaped reference signal RMP during the time period from timing T0 to T1. The DAC 230 generates a reference signal RMP the level of which gradually decreases, during the P-phase time period from timing T0 to t1, and generates the same reference signal RMP also during the D-phase time period from timing t1 to t2. However, the amplitude of the reference signal RMP during the D-phase time period is set to be larger than that during the P-phase time period. Thereafter, the same control is repeatedly performed until timing T1.

In addition, the test signal source 220 supplies a high-level signal as many times as the sampling number during the D-phase time period of a time period from timing T2 to T3, under control of the controller 360. In this time period, a correction value for the gain domain d1 is computed. Also in a time period from timing T4 to T5, a high-level signal is supplied, and a correction value for the gain domain d2 is computed. Also in a time period from timing T6 to T7 and a time period from timing T8 to T9, high-level signals are supplied, and a correction value for the gain domain d3 and a correction value for the gain domain d4 are computed.

As depicted in FIG. 13, the test signal source 220 supplies only high-level signals for each gain domain during the D-phase time period.

FIG. 14 is a diagram depicting one example of variation of test signals and reference signals according to the comparative embodiment. In a time period from timing T0 to T1 prior to the video time period, the test signal source 220 according to the comparative embodiment supplies a high-level signal as many times (e.g., 128 times) as the sampling number during the D-phase time period, under control of the controller 360.

Next, in a time period from timing T2 to T3, the test signal source 220 according to the comparative embodiment continuously supplies a low-level signal during the P-phase time period and the D-phase time period. In a time period from timing T1 to T3, a correction value for the gain domain d0 is computed.

Next, in a time period from timing T4 to T5, the test signal source 220 according to the comparative embodiment supplies a high-level signal. Next, in a time period from timing T6 to T7, the test signal source 220 according to the comparative embodiment supplies a low-level signal. In a time period from timing T4 to T7, a correction value for the gain domain d1 is computed. Thereafter, the same control is repeatedly performed for up to the gain domain d3.

As depicted in FIG. 14, according to the comparative embodiment in which the test signal source 220 supplies high-level and low-level signals during the D-phase time period, the calibration time period is longer than that in the case where only high-level signals are supplied during the D-phase time period.

FIGS. 15A and 15B depict diagrams for an analog gain error correction method according to the first embodiment of the present technology. FIG. 15A is one example of a graph depicting the relation between an incident light quantity and an output level in each column after correction of offsets but before correction of analog gains. FIG. 15B is one example of a graph depicting the relation between an incident light quantity and an output level in each column after correction of analog gains. In FIGS. 15A and 15B, the dashed line indicates a characteristic in the first column C1, and the thin solid line indicates a characteristic in the second column C1. The characteristics of the remaining columns excluding the columns C1 and C2 are omitted. The thick solid line indicates an average characteristic of all the columns.

As depicted in FIG. 15A, before correction of analog gains, the inclinations (i.e., analog gains) in respective columns are dispersed due to product variation in the columns. Therefore, the correction section 350 corrects the digital signal by a gain correction coefficient while setting the average analog gain of all the columns as a target value. As a result, as depicted in FIG. 15B, the analog gains in all the columns are made substantially uniform. Consequently, fixed pattern noise of a vertical stripe shape which is caused by dispersion of analog gains can be eliminated.

[Operation Example of Solid-State Imaging Element]

Figure 16:
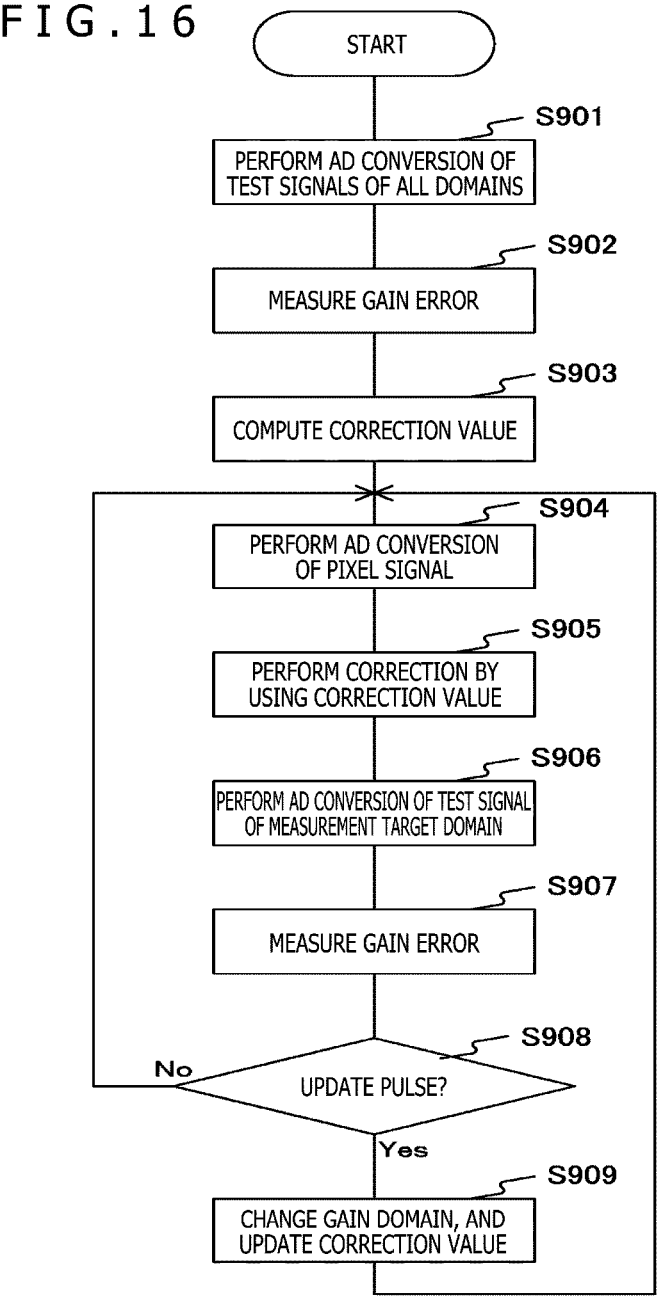
FIG. 16 is a flowchart depicting one example of operation of the solid-state imaging element according to the first embodiment of the present technology.

FIG. 16 is a flowchart depicting one example of operation of the solid-state imaging element 200 according to the first embodiment of the present technology. The operation of the solid-state imaging element 200 is started when a predetermined application for capturing image data is started, for example.

The column signal processing section 280 of the solid-state imaging element 200 performs AD conversion of high-level test signals for all the gain domains (step S901). The gain error measurement section 310 measures a gain error in each column and each gain domain (step S902). Subsequently, the correction value calculation section 320 computes a correction value for each column and each gain domain (step S903).

Subsequently, during the video time period, the column signal processing section 280 generates a frame by performing AD conversion of pixel signals of all the pixels (step S904). The correction section 350 corrects digital signals of the frame according to the correction value (step S905).

Next, during the vertical blanking time period, the column signal processing section 280 performs AD conversion of a test signal for a measurement target gain domain (step S906). The gain error measurement section 310 measures a column gain error in each column for the measurement target gain domain (step S907).

The correction value calculation section 320 determines whether or not an update pulse has been generated (step S908). In a case where any update pulse has not been generated (step S908: No), the solid-state imaging element 200 repeatedly executes the flow from step S904.

In a case where an update pulse has been generated (step S908: Yes), the correction value calculation section 320 computes a correction value in each column for the correction target gain domain, and performs updating according to the computation result (step S909). After step S909, the solid-state imaging element 200 repeatedly executes the flow from step S904.

According to the first embodiment of the present technology, the correction value calculation section 320 obtains a correction value for correcting an analog gain error in each column, and the correction section 350 carries out correction according to the correction value. Therefore, noise caused by dispersion of analog gains in respective columns can be eliminated. As a result, the image quality of image data can be improved. Further, since the test signal source 220 supplies only a high-level signal as a test signal during the D-phase time period, the calibration time period is shorter than that in the case where high-level and low-level signals are supplied during the D-phase time period.

[Modification]

In the above-mentioned first embodiment, the test signal source 220 supplies only high-level signals for all the gain domains during the D-phase time period. With this configuration, however, dispersion of offsets cannot be corrected. A modification of the first embodiment differs from the first embodiment in that the test signal source 220 according to the modification further outputs a low-level signal for a reference gain domain d0 during the D-phase time period.

Figure 17A:
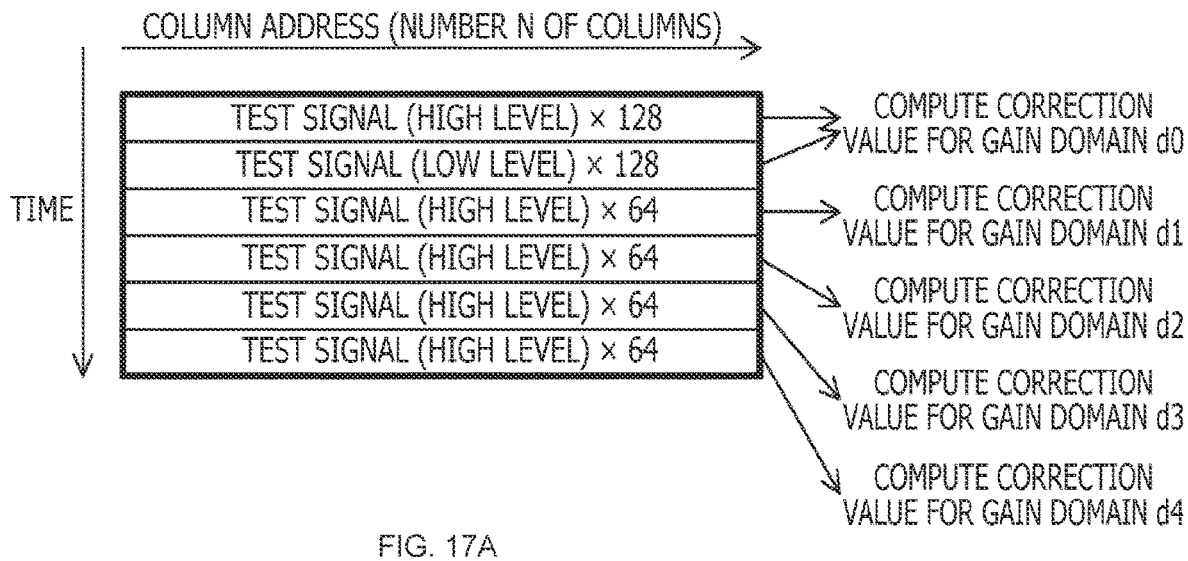
FIGS. 17A and 17B depict one example of diagrams of test signals and a frame according to a modification of the first embodiment of the present technology.
Figure 17B:
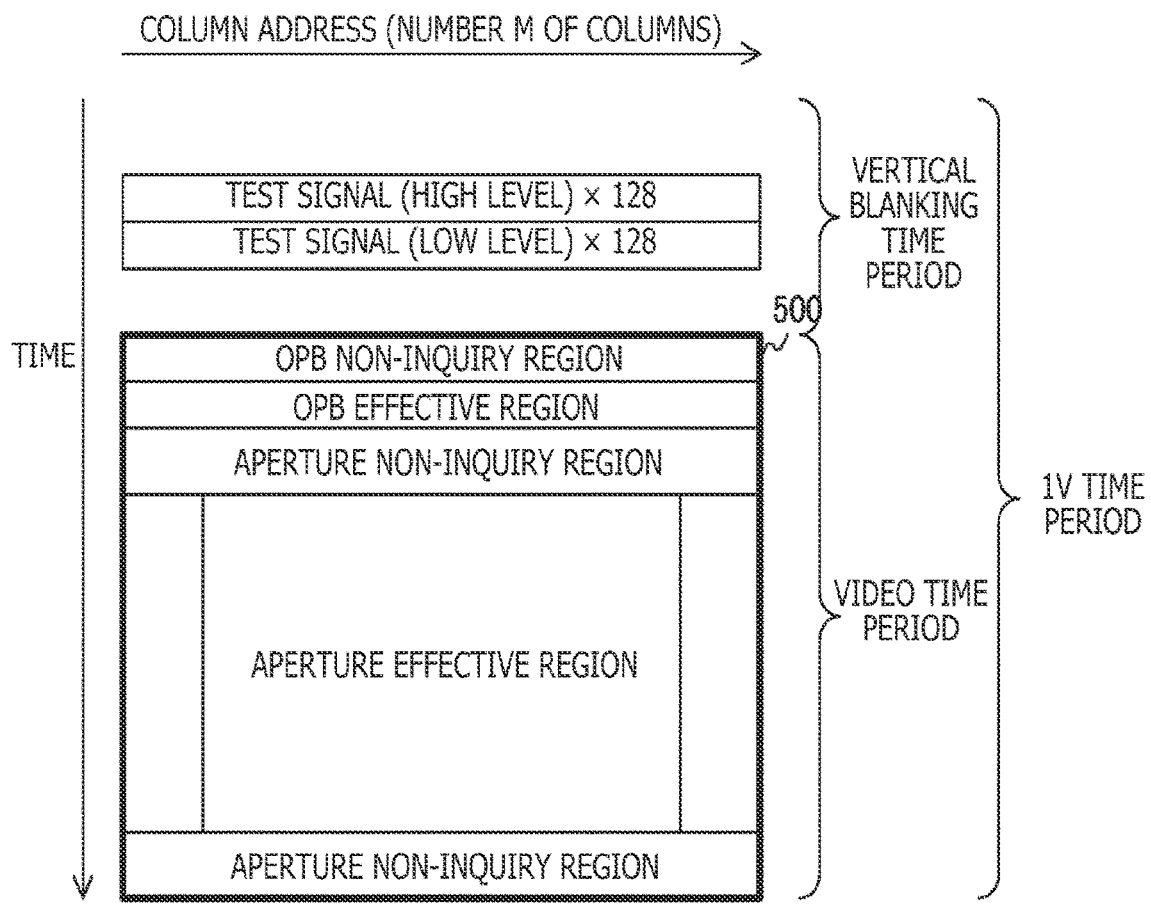

FIGS. 17A and 17B depict one example of diagrams of test signals and a frame according to the modification of the first embodiment of the present technology. FIG. 17A depicts one example of test signals that are supplied in the start-time process. FIG. 17B depicts one example of a frame and test signals that are supplied in the divisional process. In FIGS. 17A and 17B, each horizontal axis indicates a column address while each vertical axis indicates a time.

As depicted in FIG. 17A, in the start-time process, the test signal source 220 supplies high-level and low-level test signals for the reference gain domain d0 during the D-phase time period. A value (e.g., 128) that is greater than that for the remaining gain domains is set as a sampling number for each of the high level and the low level.

Moreover, the test signal source 220 supplies high-level test signals for the remaining gain domains d1 to d3 during the D-phase time period.

In addition, as depicted in FIG. 17B, during the vertical blanking time period, the test signal source 220 supplies a predetermined number of test signals for a measurement target gain domain to all the columns during the D-phase time period. High-level and low-level signals for the reference gain domain d0 are supplied during the D-phase time period, while only high-level signals are supplied for the remaining gain domains.

Figure 18A:
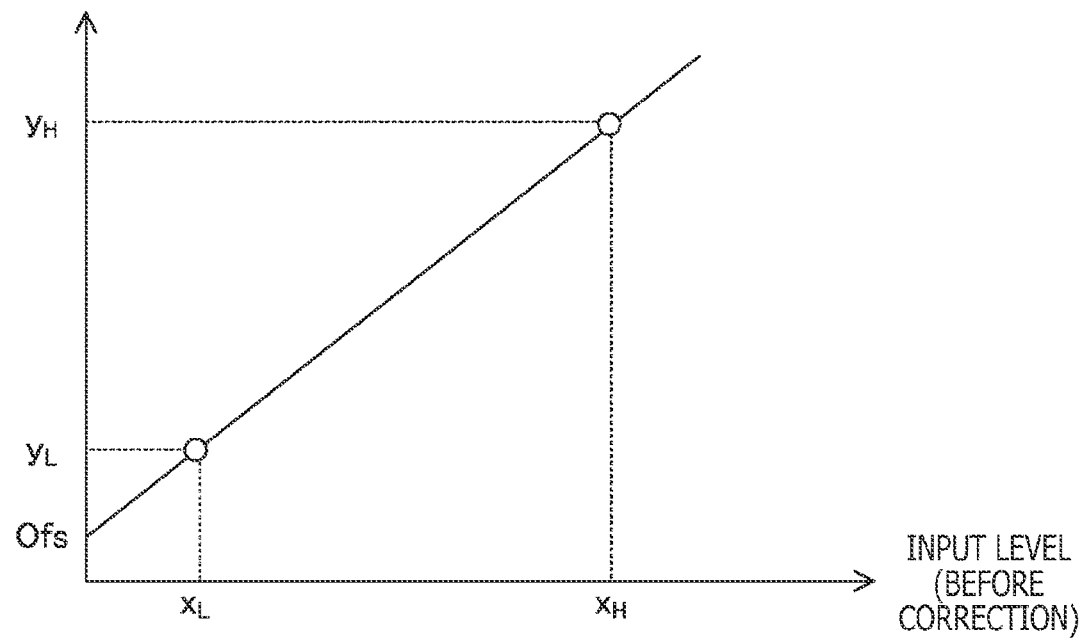
FIGS. 18A and 18B depict one example of graphs of the relation between an input level and an output level in the modification of the first embodiment of the present technology.
Figure 18B:
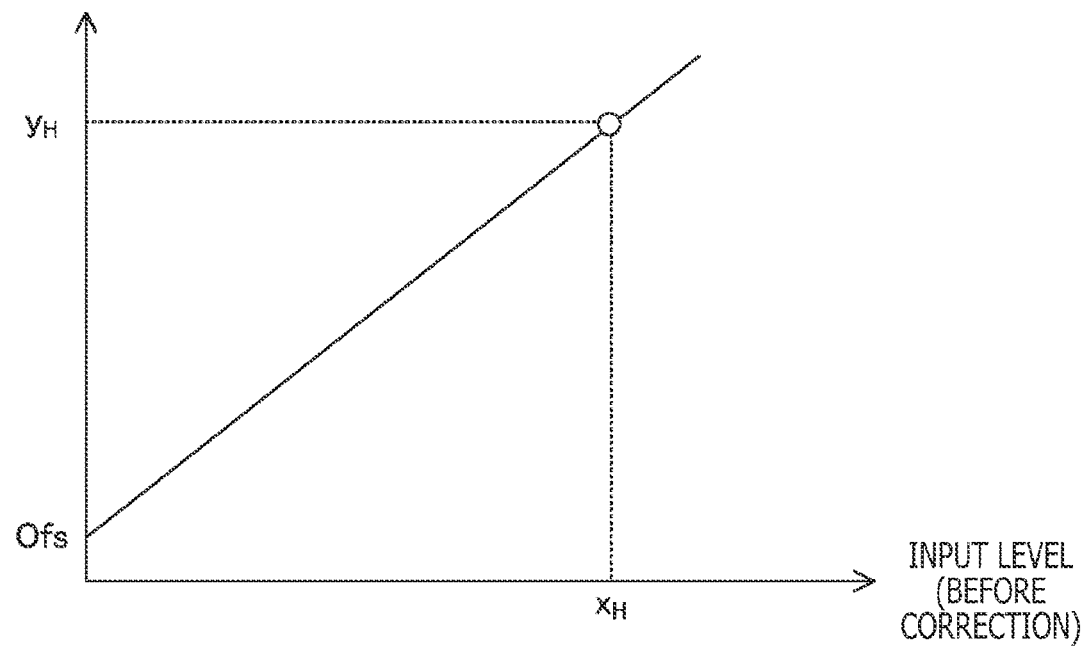

FIGS. 18A and 18B depict one example of graphs of the relation between an input level and an output level according to the modification of the first embodiment of the present technology. FIG. 18A depicts one example of a graph depicting the relation between an input level and an output level in the gain domain d0. FIG. 18B depicts one example of a graph depicting the relation between an input level and an output level in the gain domain d1 or later. In FIGS. 18A and 18B, each vertical axis indicates the level (i.e., output level) of a digital signal Dout. In FIGS. 18A and 18B, each horizontal axis indicates the absolute value of the level (i.e., input level) of an input signal Ain before correction.

As previously explained, the test signal source 220 supplies high-level and low-level test signals for the reference gain domain d0 during the D-phase time period. The gain error measurement section 310 measures an inclination g and an offset Ofs according to the following expressions.

$$g = (y_H - y_L)/(x_H - x_L) \quad \text{Expression 5}$$

$$Ofs = (x_H y_L - x_L y_H)/(x_H - x_L) \quad \text{Expression 6}$$

In the expression, $y_L$ represents the level (output level) of a digital signal obtained by conversion of the low level $x_L$.

In a case where the sampling number is 2 or greater, the correction value calculation section 320 obtains a statistical amount STo (the average, the sum, or the like) of the offset Ofs in each column, as well as the statistical amount STg of the inclinations g. The statistical amount STo in the n-th column for the m-th gain domain is defined as $STO_{cn\_dm}$.

Then, the correction value calculation section 320 computes, as an offset correction coefficient b, the average value of AD conversion values for the low level in the respective columns for each gain domain. Further, the correction value calculation section 320 also computes the gain correction coefficient "a" for each column.

In addition, the test signal source 220 supplies only high-level signals for the gain domains d1 and later during the D-phase time periods. The gain error measurement section 310 computes an analog gain and an offset in each column according to Expression 5 and Expression 6. However, an output level yL corresponding to the low level cannot be obtained for the gain domains d1 and later, as depicted in FIG. 18B, and thus, the output level yL for the gain domain d0 is used. It is to be noted that computation of an offset for the gain domains d1 and later may be omitted.

For the gain domain d1 or later, the correction value calculation section 320 obtains correction values (a gain correction coefficient and an offset correction coefficient) for each column and each gain domain.

As previously explained, since the test signal source 220 supplies a low-level signal for the gain domain d0, the correction value calculation section 320 can compute an offset correction coefficient as well as a gain correction coefficient. As a result, the correction accuracy can be improved, compared to the first embodiment in which correction is carried out according to a gain correction coefficient only.

FIG. 19 is a diagram depicting one example of variation of test signals and reference signals according to the modification of the first embodiment. In a time period from timing T0 to T1 prior to the video time period, the test signal source 220 supplies a high-level signal as many times (e.g., 128 times) as the sampling number during the D-phase time period, under control of the controller 360.

Next, in a time period from timing T2 to T3, the test signal source 220 according to the comparative embodiment supplies low-level signals continuously during the P-phase time period and the D-phase time period. In a time period from timing T1 to T3, a correction value for the gain domain d0 is computed.

Next, in a time period from timing T4 to T5, the test signal source 220 supplies a high-level signal as many times as the sampling number during the D-phase time period. In the time period from timing T4 to T5, a correction value for the gain domain d1 is computed. In a time period from timing T6 to T7, high-level signals are also supplied, and a correction value for the gain domain d2 is computed. Thereafter, the same control is repeatedly performed.

According to the modification of the first embodiment of the present technology, the test signal source 220 outputs high-level and low-level signals for the reference gain domain d0 during the D-phase time period in the above-mentioned manner. Therefore, an offset correction coefficient as well as a gain correction coefficient can be computed. Accordingly, the correction accuracy can be improved, compared to the first embodiment in which correction is carried out with a gain correction coefficient only.

2. Second Embodiment

In the above-mentioned first embodiment, sampling numbers in respective gain domains are made uniform. With this configuration, however, the total of the sampling numbers becomes greater with an increase of gain domains, so that the calibration time period becomes long. The test signal source 220 according to the second embodiment differs from that of the first embodiment in that the test signal source 220 according to the second embodiment sets a sampling number according to an analog gain concerning a gain domain such that the calibration time period is shortened.

In the second embodiment, as a sampling number in each gain domain, a value corresponding to an analog gain concerning the corresponding gain domain is set. It is general that, as an analog gain is higher, variation of digital signals is greater. Therefore, a smaller sampling number is set when an analog gain is lower. For example, the analog gains in the gain domains d4, d3, d2, d1, and d0 sequentially become larger in this order. In this case, the sampling numbers in the gain domains d4, d3, d2, d1, and d0 become sequentially become smaller in this order.

In addition, the test signal source 220 according to the second embodiment supplies both a high-level signal and a low-level signal for each gain domain during the D-phase time period.

FIG. 20 is a diagram depicting one example of test signals and a reference signal according to the second embodiment of the present technology. In FIG. 20, the vertical axis indicates the level of a test signal or a reference signal. In FIG. 20, the horizontal axis indicates a time.

As depicted in FIG. 20, in the start-time process, the test signal source 220 supplies a high-level test signal for the gain domain d0 in a time period from timing t0 to t1. Further, the test signal source 220 supplies a low-level test signal for the gain domain d0 in a time period from timing t1 to t2. When the sampling number in the gain domain d0 is $S_0$, $S_0 \times 2$ test signals are supplied during the time period from timing t0 to t2, and D-phase AD conversion (i.e., sampling) is performed $S_0 \times 2$ times.

Then, the test signal source 220 supplies a high-level test signal for the gain domain d1 in a time period from timing t2 to t3. Further, the test signal source 220 supplies low-level test signals for the gain domain d1 during a time period from timing t3 to t4. When the sampling number in the gain domain d1 is $S_1$, $S_1 \times 2$ test signals are supplied during a time period from timing t2 to t4, and AD conversion (i.e., sampling) for the D phase is performed $S_1 \times 2$ times.

Next, in a time period from timing t4 to t6, the test signal source 220 supplies high-level and low-level test signals for the gain domain d2. In a time period from timing t6 to t8, the test signal source 220 supplies high-level and low-level test signals for the gain domain d3. In a time period from timing t8 to t11, the test signal source 220 supplies high-level and low-level test signals for the gain domain d4.

In addition, as the difference between a high-level test signal and a low-level test signal, a greater value is set when an analog gain in the corresponding gain domain is lower. For example, in a case where the analog gains in the gain domains d0, d1, d2, d3, and d4 sequentially become larger in this order, the differences in the gain domains d0, d1, d2, d3, and d4 sequentially become smaller in this order.

In addition, a smaller number is set as a sampling number in a certain gain domain when the corresponding analog gain is lower. For example, in a case where the analog gains in the gain domains d4, d3, d2, d1, and d0 sequentially become lower in this order, the sampling numbers $S_4$, $S_3$, $S_2$, $S_1$, and $S_0$ sequentially become smaller in this order. In addition, a reference signal is also supplied during a high-level and low-level test signal supply time period.

Figure 21:
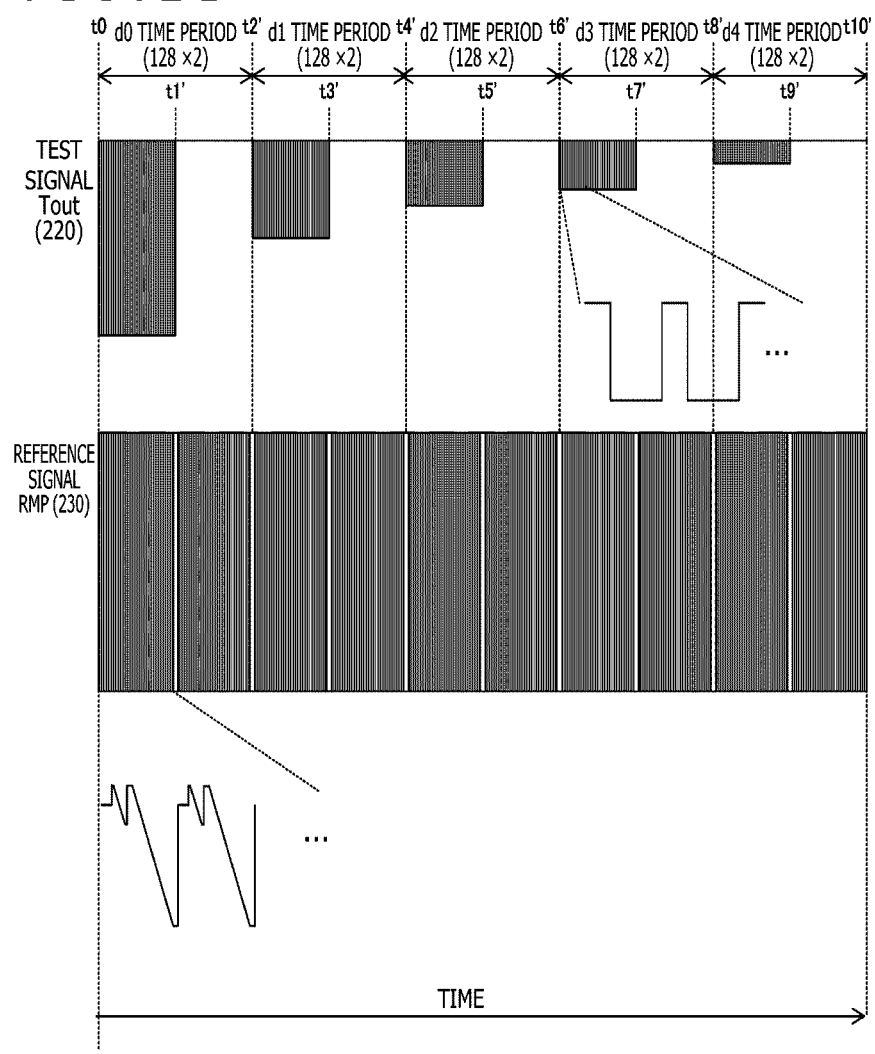
FIG. 21 is a diagram depicting one example of calibration time periods in respective gain domains according to a comparative embodiment.

On the other hand, a comparative embodiment in which respective sampling numbers in the gain domains are made uniform, as depicted in FIG. 21, is assumed.

As depicted in FIG. 21, a sampling number is set to be smaller when the corresponding analog gain is lower, so that the total sampling number in all the gain domains can be reduced, compared to the comparative embodiment. For example, when the largest sampling number $S_4$ is equal to a sampling number (e.g., 128) in the comparative embodiment, the total sampling number in all the gain domains is smaller, compared to the comparative embodiment. As a result of the reduction of sampling numbers, the calibration time period can be shortened.

Figure 22:
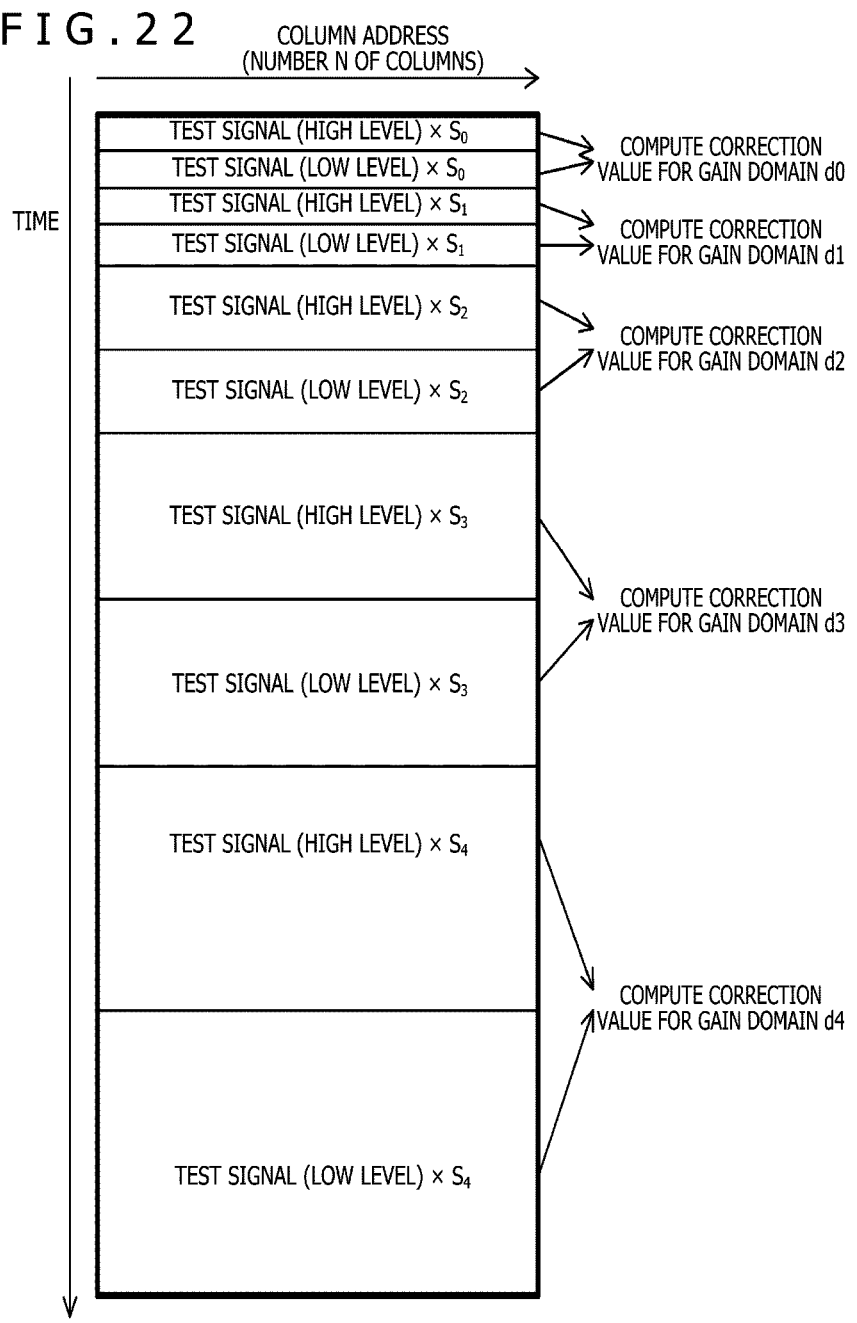
FIG. 22 is a diagram depicting one example of test signals according to the second embodiment of the present technology.

FIG. 22 is a diagram depicting one example of test signals according to the second embodiment of the present technology. In FIG. 22, the horizontal axis indicates a column address while the vertical axis indicates a time.

As depicted in FIG. 22, in the start-time process, the test signal source 220 supplies high-level test signals and low-level test signals for the gain domain d0 as many as the sampling number ($S_0$).

Also, the test signal source 220 supplies high-level and low-level test signals for the gain domain d1 as many as the sampling number ($S_1$). Thereafter, the number of high-level test signals and the number of low-level test signals which are supplied for the gain domains d2, d3, and d4, are equal to the sampling numbers $S_2$, $S_3$, and $S_4$, respectively. In a case where the analog gains in the gain domains d4, d3, d2, d1, and d0 sequentially become lower in this order, the sampling numbers $S_4$, $S_3$, $S_2$, $S_1$, and $S_0$ sequentially become smaller in this order.

On the other hand, in the comparative embodiment, the same number of test signals are supplied for each gain domain, as depicted in FIG. 10A.

It is to be noted that the first embodiment can be applied to the second embodiment. In this case, the test signal source 220 supplies only high-level signals for each gain domain during the D-phase time period. The modification of the first embodiment also can be applied to the second embodiment.

As previously explained, according to the second embodiment of the present technology, the test signal source 220 supplies test signals as many as a sampling number corresponding to an analog gain. Thus, the number of times of AD conversion can be reduced according to the analog gain. As a result, the calibration time period can be shortened.

3. Third Embodiment

In the above-mentioned first and second embodiments, the correction value calculation section 320 computes a gain correction coefficient for the gain domains d1 and later without using data on the gain domain d0. With this configuration, however, there is a possibility that linearity of a digital signal with respect to an analog gain is not ensured. The third embodiment differs from the first or second embodiment in that the linearity is corrected in the third embodiment.

Figure 23:
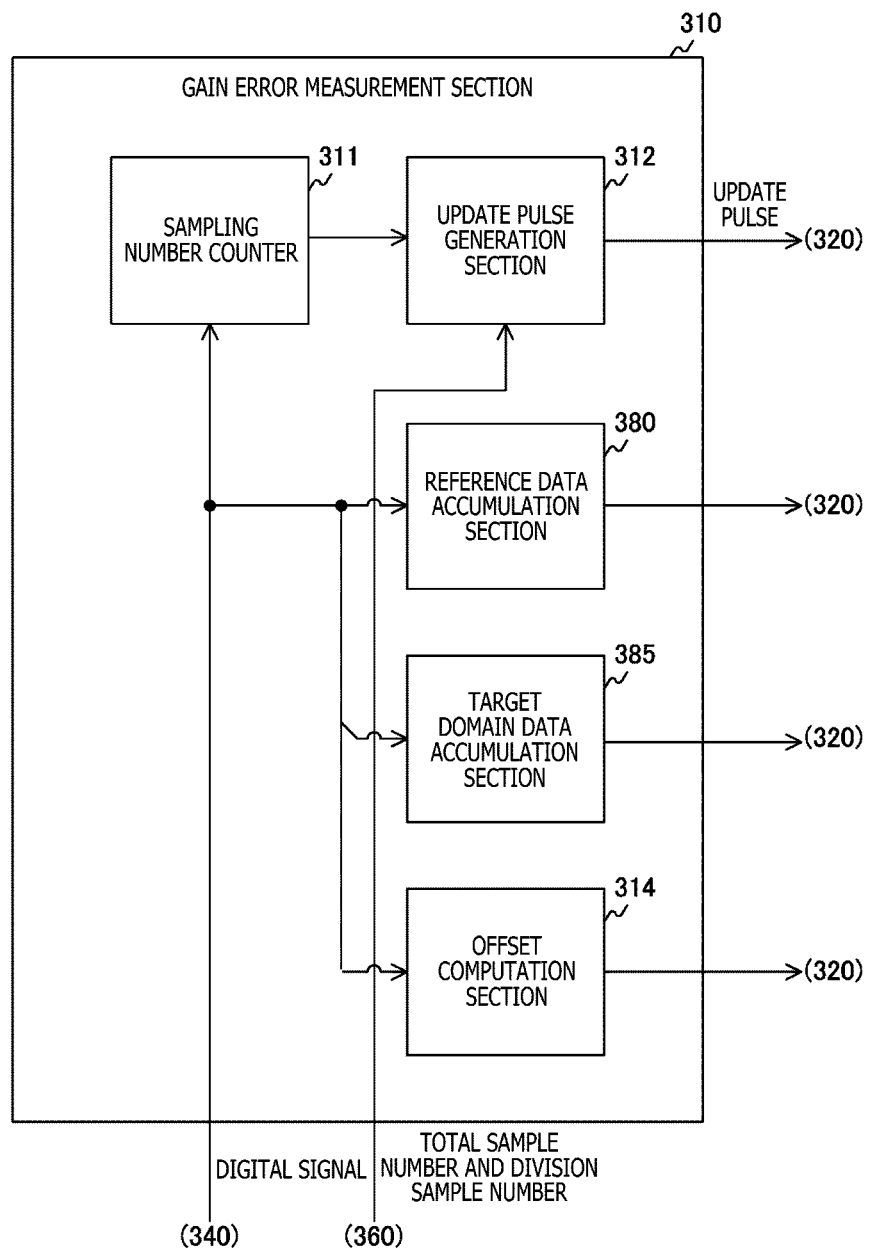
FIG. 23 is a block diagram depicting one configuration example of a gain error measurement section according to a third embodiment of the present technology.

FIG. 23 is a block diagram depicting one configuration example of the gain error measurement section 310 according to the third embodiment of the present technology. The gain error measurement section 310 includes a sampling number counter 311, an update pulse generation section 312, a reference data accumulation section 380, a target domain data accumulation section 385, and an offset computation section 315.

The sampling number counter 311 counts, as a sampling number, the number of digital signals inputted from the selector 340. The sampling number counter 311 supplies the sampling number to the update pulse generation section 312.

The update pulse generation section 312 generates an update pulse on the basis of the sampling number counted by the sampling number counter 311. A total sampling number and a divisional sampling number are inputted from the controller 360 to the update pulse generation section 312. In the start-time process, the update pulse generation section 312 generates an update pulse when the sampling number reaches the total sampling number, and supplies the update pulse to the correction value calculation section 320. In addition, in the divisional process, the update pulse generation section 312 generates an update pulse each time the sampling number reaches the divisional sampling number, and supplies the update pulse to the correction value calculation section 320.

For the reference gain domain d0, the reference data accumulation section 380 accumulates, in each column, digital signals Dout the number of which is equal to a sampling number. The reference data accumulation section 380 supplies, as a sum total value $SUM_0$, a result of the accumulation to the correction value calculation section 320.

For the gain domain d1 or later, the target domain data accumulation section 385 accumulates, in each column, digital signals Dout the number of which is equal to the sampling number. The target domain data accumulation section 385 supplies a result of the accumulation to the linearity correction value calculation section 320. A result of the accumulation for the m-th gain domain is defined as a sum total value $SUM_m$.

The offset computation section 315 computes an offset for each column and each gain domain. The offset computation section 315 computes an offset Ofs in each gain domain according to Expression 6 each time sampling is performed. The gain computation section 314 computes a statistical amount STo of the offsets in each gain domain and each column. The statistical amount STo in the n-th column for the m-th gain domain is defined as $STo_{cn\_dm}$. In the start-time process, the respective statistical amounts $STo_{cn\_dm}$ are computed for all the gain domains. On the other hand, in the divisional process, the statistical amount $STo_{cn\_dm}$ in each frame is computed for a measurement target gain domain.

The offset computation section 315 supplies, as measurement data, data including the computation result to the correction value calculation section 320. It is to be noted that the gain error measurement section 310 computes offsets but may refrain from computing any offset when an error is small, for example.

Figure 24:
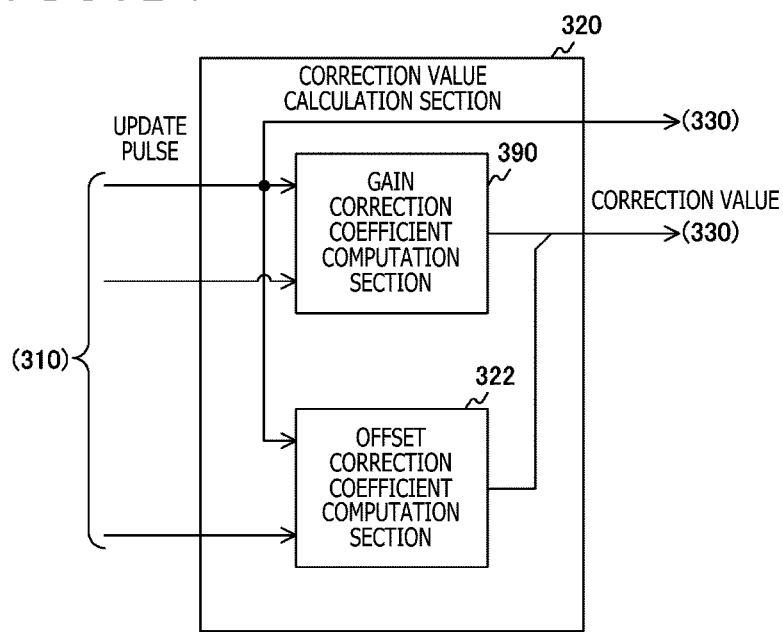
FIG. 24 is a block diagram depicting one configuration example of a correction value calculation section according to the third embodiment of the present technology.

FIG. 24 is a block diagram depicting one configuration example of the correction value calculation section 320 according to the third embodiment of the present technology. The correction value calculation section 320 includes a gain correction coefficient computation section 390 and an offset correction coefficient computation section 322.

The gain correction coefficient computation section 390 computes a gain correction coefficient for each column and for the gain domains d1 and later. The gain correction coefficient $a_m$ for the m-th gain domain is obtained, for example, according to the following expression.

$$a_m = (SUM_0 \times S_m)/(SUM_m \times S_0) \qquad \text{Expression 7}$$

In the expression, $S_O$ represents a sampling number in the gain domain d0, and $S_m$ represents a sampling number in the m-th gain domain.

The gain correction coefficient computation section 390 supplies the gain correction coefficient $a_m$ for each column and each gain domain to the storage section 330.

The offset correction coefficient computation section 322 computes an offset correction coefficient "b" for each column and each gain domain, and outputs the offset correction coefficient "b" to the storage section 330. The offset correction coefficient computation section 322 computes, as the offset correction coefficient b, the average values of AD conversion values for low-level signals in the respective columns for the gain domain d0. By the same computation, an offset correction coefficient "b" in each column is also computed for the gain domain d1 and later.

Figure 25A:
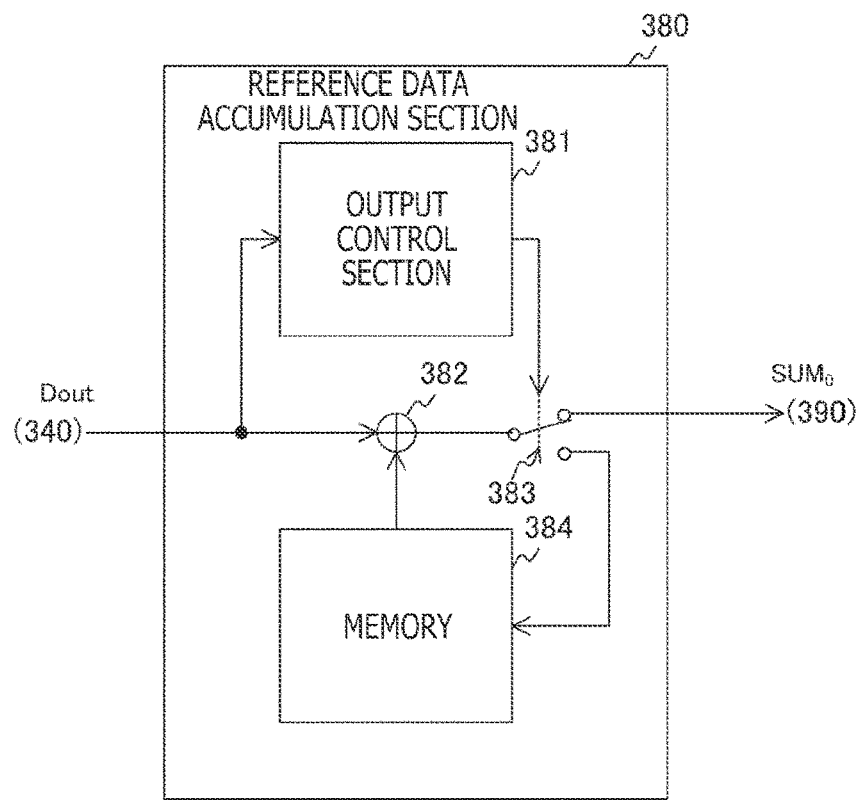
FIGS. 25A and 25B depict one configuration example of block diagrams of a reference data accumulation section and a target domain data accumulation section according to the third embodiment of the present technology.
Figure 25B:
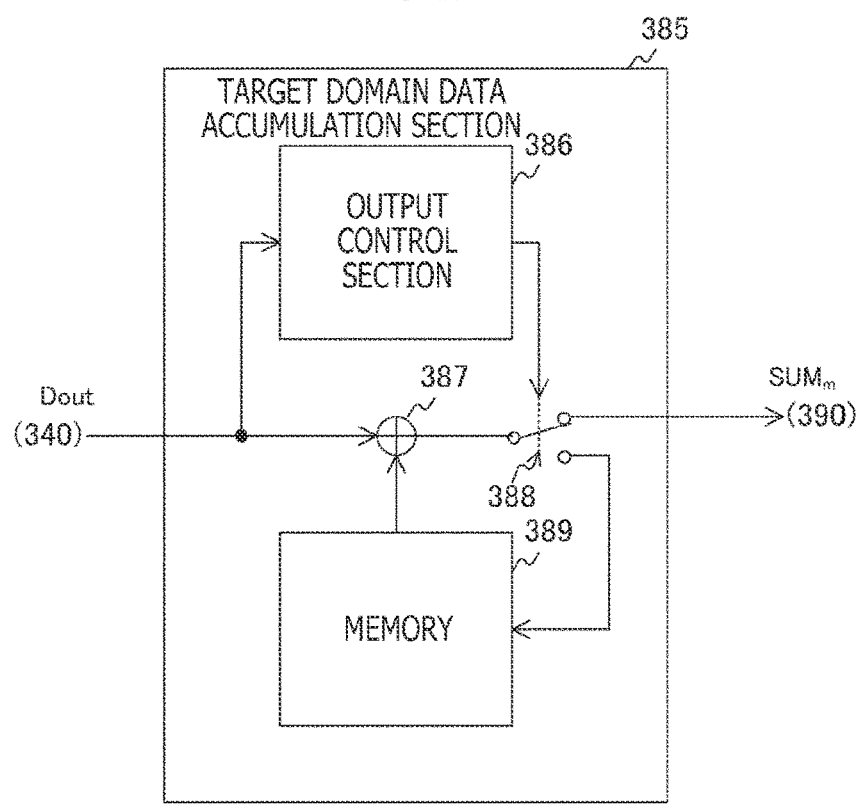

FIGS. 25A and 25B depict one configuration example of block diagrams of the reference data accumulation section 380 and the target domain data accumulation section 385 according to the third embodiment of the present technology. The reference data accumulation section 380 includes an output control section 381, an adder 382, a selector 383, and a memory 384. The target domain data accumulation section 385 includes an output control section 386, an adder 387, a selector 388, and a memory 389.

The output control section 381 controls an output destination of the selector 383. The output control section 381 counts the number of digital signals Dout in each column. When the count value is less than a sampling number corresponding to the gain domain d0, the output control section 381 performs control to select the memory 384 as an output destination of the selector 383. When the count value reaches the sampling number, the output control section 381 switches the output destination of the selector 383 to the gain correction coefficient computation section 390.

The adder 382 adds up, in each column, the digital signals Dout for the gain domain d0 and a held value in the memory 384. The adder 382 outputs the addition value to the selector 383.

The selector 383 outputs the addition value supplied from the adder 382 to the memory 384 or the gain correction coefficient computation section 390, under control of the output control section 381. According to the value outputted to the memory 384, the memory 384 is updated. The sum total value $SUM_O$ is outputted to the gain correction coefficient computation section 390. The memory 384 holds the output value for each column from the selector 383.

The output control section 386 controls an output destination of the selector 388. The output control section 386 counts the number of digital signals Dout in each column for the gain domains d1 and later, and performs control to select the memory 389 as an output destination of the selector 388 when the count value is less than a sampling number corresponding to a gain domain which is the computation target. When the count value reaches the sampling number, the output control section 386 switches an output destination of the selector 388 to the gain correction coefficient computation section 390.

The adder 387 adds up the digital signals Dout in each column and the held value in the memory 389 for each of the plurality of gain domains d1 and later. The adder 387 outputs the addition value to the selector 388.

The selector 388 outputs the addition value supplied from the adder 387 to the memory 389 or the gain correction coefficient computation section 390, under control of the output control section 386. According to the value outputted to the memory 389, the memory 389 is updated. The sum total value $SUM_m$ is outputted to the gain correction coefficient computation section 390. The memory 389 holds an output value for each column from the selector 388.

Figure 26:
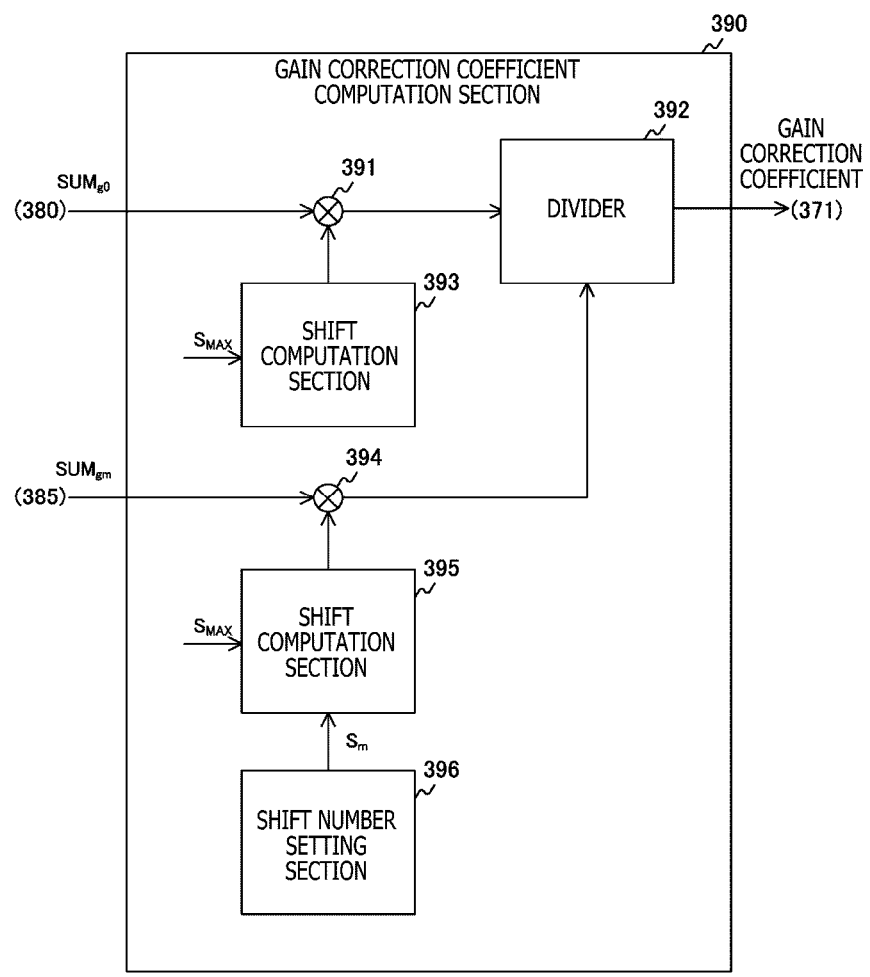
FIG. 26 is a block diagram depicting one configuration example of a gain correction coefficient computation section according to the third embodiment of the present technology.

FIG. 26 is a block diagram depicting one configuration example of the gain correction coefficient computation section 390 according to the third embodiment of the present technology. The gain correction coefficient computation section 390 includes a multiplier 391, a divider 392, a shift computation section 393, a multiplier 394, a shift computation section 395, and a shift number setting section 396.

The shift computation section 393 shifts a predetermined maximum sampling number $S_{MAX}$ toward a direction to reduce the number of digits, by the sampling number $S_O$ for the gain domain d0 as a shift number. The shift computation section 393 outputs the data obtained by the shifting, to the multiplier 391. It is to be noted that the shift computation section 393 is one example of the first shift computation section set forth in the claims.

The multiplier 391 multiplies the sum total value $SUM_O$ of the gain domain d0 with output from the shift computation section 393. The multiplier 391 supplies a result of the multiplication to the divider 392. It is to be noted that the multiplier 391 is one example of the first multiplier set forth in the claims.

The shift number setting section 396 sets a shift number for the shift computation section 395. To the shift number setting section 396, information for designating a gain domain which is a linearity correction target is inputted. The shift number setting section 396 supplies, as the shift number, a sampling number $S_m$ corresponding to the designated gain domain to the shift computation section 395.

The shift computation section 395 shifts a predetermined maximum sampling number $S_{MAX}$ toward a direction to reduce the number of digits, by the shift number supplied from the shift number setting section 396. The shift computation section 395 outputs data obtained by the shifting, to the multiplier 394. It is to be noted that the shift computation section 395 is one example of the second shift computation section set forth in the claims.

The multiplier 394 multiplies, for each of the plurality of gain domains d1 and later, the sum total value $SUM_m$ with the output from the shift computation section 395. The multiplier 394 supplies a result of the multiplication to the divider 392. It is to be noted that the multiplier 394 is one example of the second multiplier set forth in the claims.

The divider 392 divides the multiplication result in each column obtained by the multiplier 391, by the multiplication result in the column obtained by the multiplier 394 for the gain domains d1 and later. The divider 392 supplies, as a gain correction coefficient $a_m$, a result of the division for the m-th gain domain to the storage section 330. The gain correction coefficient $a_m$ is expressed by the following expression.

$$a_m = \{SUM_O \times (S_{MAX}/S_O)\} / \{SUM_m \times (S_{MAX}/S_m)\} \quad \text{Expression 8}$$

Expression 8 is corresponding to Expression 7.

Figure 27A:
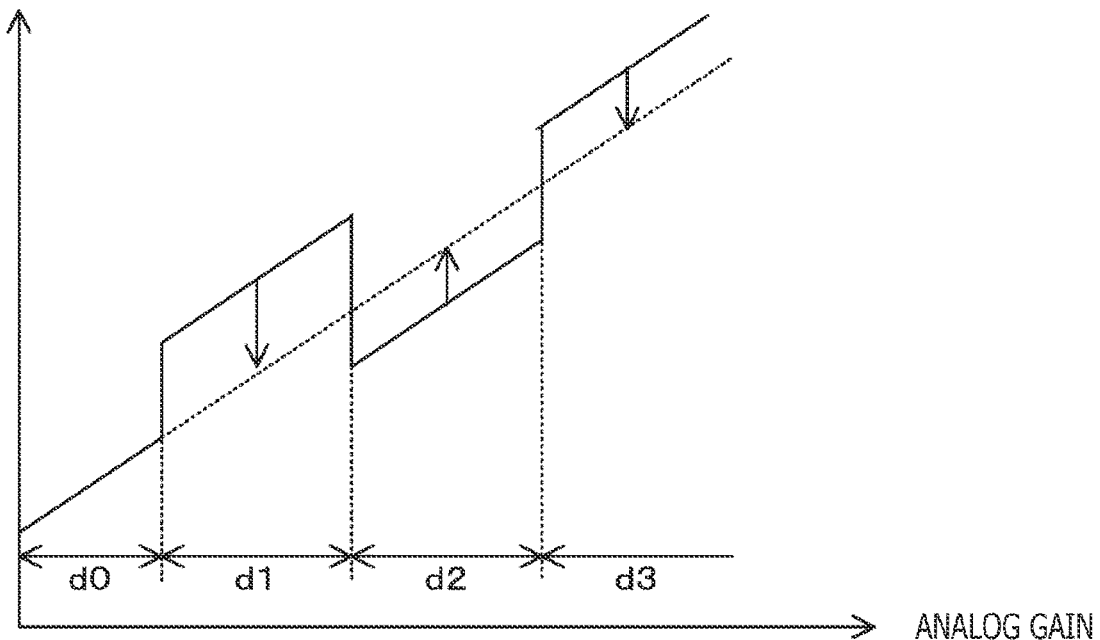
FIGS. 27A and 27B depict diagrams for a linearity correction method according to the third embodiment of the present technology.
Figure 27B:
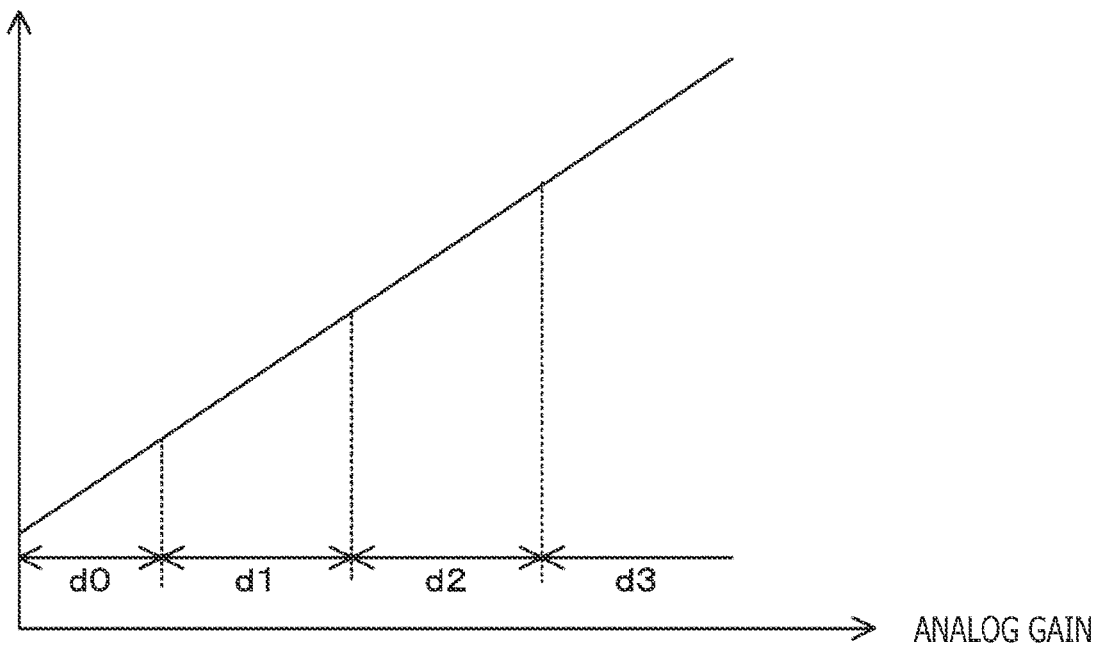

FIGS. 27A and 27B depict diagrams for a linearity correction method according to the third embodiment of the present technology. FIG. 27A is one example of a graph depicting the relation between the level (i.e., output level) of a digital signal Dout and an analog gain in a case where correction of linearity is not performed. FIG. 27B is one example of a graph depicting the relation between the output level and the analog gain in a case where correction of linearity is performed.

In a case where the gain correction coefficient computation section 321 obtains a gain correction coefficient by using not Expression 8 but a statistical amount of digital signals in all the columns for a certain gain domain, as in the first embodiment, the linearity is not corrected. In this case, as depicted in FIG. 27A, the linearity of the output level in each of the gain domains d1 to d3 is deviated from that in the gain domain d0.

Therefore, the gain correction coefficient computation section 321 computes a gain correction coefficient by additionally using reference data on the gain domain d0 as indicated by Expression 8. As a result, the linearity in each of the gain domains can be corrected, as depicted in FIG. 27B.

It is to be noted that, in a case where the third embodiment is applied to the first embodiment, the sampling numbers in respective gains are made uniform. Thus, $S_0$ and $S_m$ are set to the same value in Expression 7 and Expression 8.

According to the third embodiment of the present technology, the gain correction coefficient computation section 390 computes gain correction coefficients for the gain domains d1 and later by using reference data of the gain domain d0 in the above-mentioned manner. Accordingly, linearity correction can be performed.

[Modification]

In the above-mentioned third embodiment, the gain correction coefficient computation section 390 carries out a shift computation on the maximum sampling number $S_{MAX}$ for each gain domain. With this configuration, however, the computation amount is increased with an increase of the number of gain domains. The gain correction coefficient computation section 390 according to a modification of the second embodiment differs from that of the third embodiment in that the computation amount in the gain correction coefficient computation section 390 according to the modification is reduced.

Figure 28:
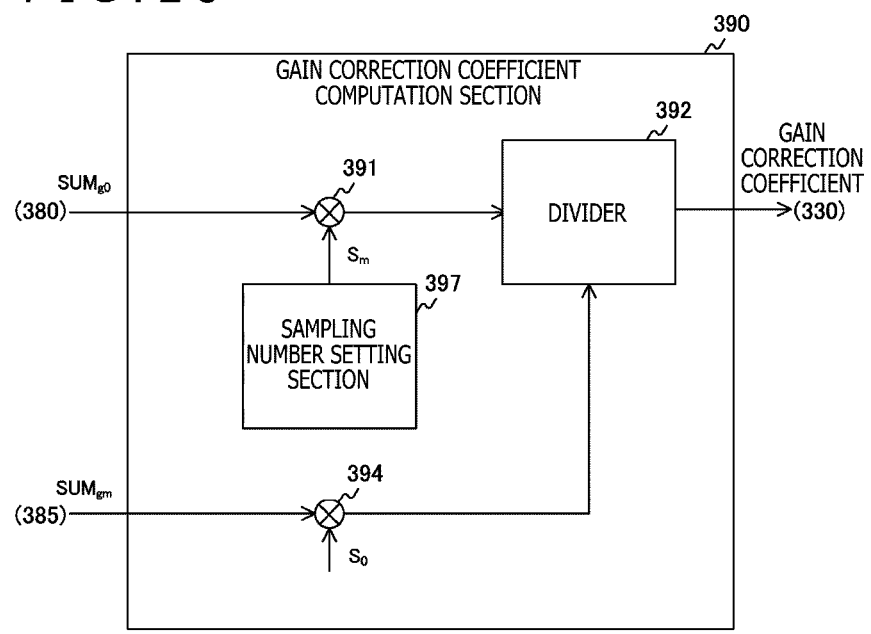
FIG. 28 is a block diagram depicting one configuration example of a gain correction coefficient computation section according to a modification of the third embodiment of the present technology.

FIG. 28 is a block diagram depicting one configuration example of the gain correction coefficient computation section 390 according to the modification of the third embodiment of the present technology. The gain correction coefficient computation section 390 according to the modification of the second embodiment differs from that of the third embodiment in that neither the shift computation section 393 nor 395 is provided in the modification.

The multiplier 391 according to the modification of the second embodiment multiplies the total number $SUM_0$ in the gain domain d0 with the sampling number $S_m$ in the m-th gain domain.

Further, the multiplier 394 according to the modification of the third embodiment multiplies the total number $SUM_M$ in the m-th gain domain with the sampling number $S_0$ in the gain domain d0.

With the configuration depicted in FIG. 28, Expression 7 can be calculated. In addition, as a result of omission of the shift computation sections 393 and 395, the computation amount at the gain correction coefficient computation section 390 can be reduced.

According to the modification of the third embodiment of the present technology, the shift computation sections 393 and 395 are not needed because multiplication of the sum and the corresponding sampling number is carried out for each gain domain in the above-mentioned manner. As a result, the computation amount at the gain correction coefficient computation section 390 can be reduced.

4. Application Examples to Mobile Body

The technology according to the present disclosure is applicable for various kinds of products. For example, the technology according to the present disclosure can be implemented as a device included in any type of mobile bodies such as a vehicle, an electric vehicle, a hybrid electric vehicle, a motorcycle, a bicycle, a personal mobility, an airplane, a drone, a ship, or a robot.

Figure 29:
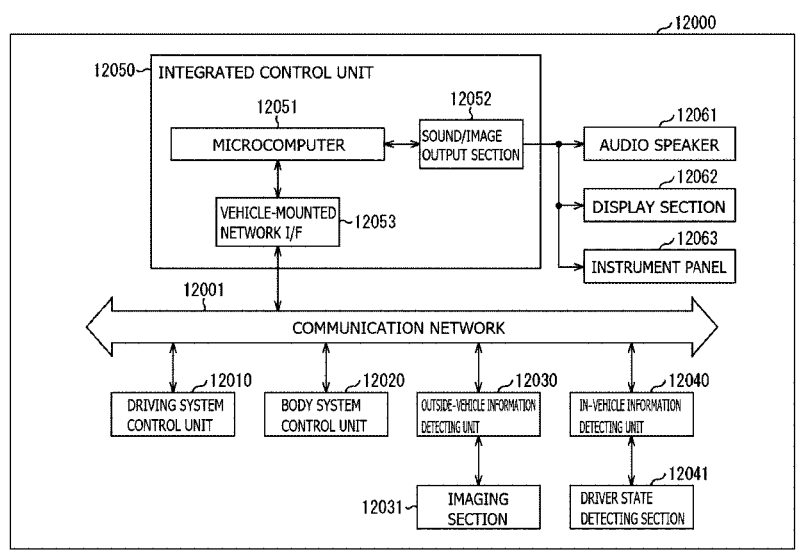
FIG. 29 is a block diagram depicting an example of schematic configuration of a vehicle control system.

FIG. 29 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display and a head-up display.

Figure 30:
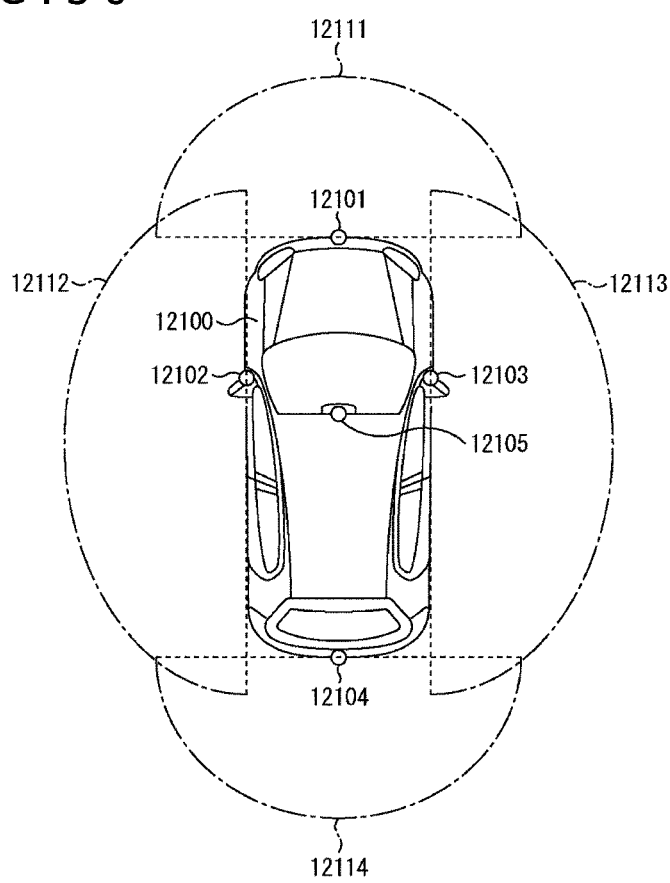
FIG. 30 is a diagram of assistance in explaining an example of installation positions of an outside-vehicle information detecting section and an imaging section.

FIG. 30 is a diagram depicting an example of the installation position of the imaging section 12031.

In FIG. 30, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 30 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

One example of the vehicle control system to which the technology according to the present disclosure can be applied has been explains so far. The technology according to the present disclosure can be applied to the imaging section 12301 of the above-mentioned configuration. For example, the imaging device 100 in FIG. 1 can be applied to the imaging section 12031. When the technology according to the present disclosure is applied to the imaging section 12031, individual pattern noise is eliminated, so that an easy-to-see captured image can be obtained. Accordingly, fatigue of a driver can be relieved.

It is to be noted that the above-mentioned embodiments each exemplify one example for embodying the present technique, and the features of the embodiments have a correspondence with the invention-specifying features of the claims. Similarly, the invention-specifying features of the claims have the correspondence relation with components, of the embodiments, referred to by the same names. However, the present technique is not limited to the embodiments, and can be embodied by various modifications of the embodiments within the scope of the gist of the present technique.

It is to be noted that the effects described in the present description are just examples, and thus, are not limited. In addition, any other effect may be provided.

It is to be noted that the present technology can also have the following configurations.

(1)

A solid-state imaging element including:

a test signal source that generates a test signal of a predetermined level;

an analog-to-digital converter that increases/decreases an analog signal according to an analog gain selected from among a plurality of analog gains, and converts the increased/decreased analog signal to a digital signal;

an input switching section that inputs, as the analog signal, either the test signal or a pixel signal to the analog-to-digital converter;

a correction value calculation section that, on the basis of the test signal and the digital signal, obtains a correction value for correcting an error in the selected analog gain, and outputs the correction value; and a correction section that corrects the digital signal according to the outputted correction value.

(2)

The solid-state imaging element according to (1), in which the analog-to-digital converter includes a comparator that compares the analog signal with a predetermined ramp signal, and outputs a result of the comparison, and a digital signal generation section that generates the digital signal on the basis of the comparison result, and the comparator includes a differential amplification circuit that amplifies a difference between a predetermined reference voltage and a voltage of a predetermined node, and outputs the amplified difference as the comparison result, a vertical signal line-side capacity that is inserted between the predetermined node and the input switching section, a ramp-side capacity that is inserted between the predetermined node and a digital-to-analog converter that generates the ramp signal, and a switch that changes a capacity ratio of the vertical signal line-side capacity and the ramp-side capacity according to a predetermined control signal.

(3)

The solid-state imaging element according to (2), in which the plurality of analog gains is classified into a plurality of gain domains in which the different capacity ratios are set, kinds of the level of the test signal include a high level that corresponds to a pixel signal when an incident light quantity is greater than a predetermined value and a low level that corresponds to a pixel signal when the incident light quantity is not greater than the predetermined value, and the test signal source supplies only the high level for each of the plurality of gain domains during a signal level conversion time period for converting a signal level according to a light exposure quantity.

(4)

The solid-state imaging element according to (2), in which the plurality of analog gains is classified into a plurality of gain domains in which the different capacity ratios are set, the kinds of the level of the test signal include a high level that corresponds to a pixel signal when an incident light quantity is greater than a predetermined value and a low level that corresponds to a pixel signal when the incident light quantity is not greater than the predetermined value, and the test signal source supplies the high level and the low level sequentially for a reference gain domain among the plurality of gain domains during a signal level conversion time period for converting the signal level according to a light exposure quantity, and supplies only the high level for the remaining gain domains among the plurality of gain domains during the signal level conversion time period.

(5)

The solid-state imaging element according to any one of (2) to (4), in which the plurality of analog gains is classified into a plurality of gain domains in which the different capacity ratios are set, and the test signal source supplies the test signals as many as a sampling number that corresponds to an analog gain regarding the corresponding gain domain.

(6)

The solid-state imaging element according to (5), further including:

a reference data accumulation section that accumulates the digital signals for a reference gain domain among the plurality of gain domains, and outputs a result of the accumulation as a first addition result; and a target domain data accumulation section that accumulates the digital signals for each of the gain domains excluding the reference gain domain among the plurality of gain domains, and outputs a result of the accumulation as a second addition result, in which the correction value calculation section calculates, as the correction value, a gain correction coefficient for correcting an analog gain on the basis of the first addition result and the second addition result.

(7)

The solid-state imaging element according to (6), in which the correction value calculation section includes a first shift computation section that carries out computation of shifting a predetermined maximum sampling number according to the sampling number in the reference gain domain, a first multiplier that multiplies computation result obtained by the first shift computation section with the first addition result, a second shift computation section that carries out computation of shifting the predetermined maximum sampling number according to the sampling numbers in each of the gain domains excluding the reference gain domain, a second multiplier that multiplies computation result obtained by the second shift computation section with the second addition result, and a divider that divides the multiplication result obtained by the first multiplier, by the multiplication result obtained by the second multiplier, and outputs, as the gain correction coefficient, a result of the division.

(8)

The solid-state imaging element according to (6), in which the correction value calculation section includes a first multiplier that multiplies the sampling number in each of the gains domains excluding the reference gain domain, with the first addition result, a second multiplier that multiplies the sampling number in the reference gain domain with the second addition result, and a divider that divides the multiplication result obtained by the first multiplier, by the multiplication result obtained by the second multiplier, and outputs, as the gain correction coefficient, a result of the division.

(9)

An imaging device including:

a pixel array section in which a plurality of pixels that each generates a pixel signal are arranged;

a test signal source that generates a test signal of a predetermined level;

an analog-to-digital converter that increases/decreases an analog signal according to an analog gain selected from among a plurality of analog gains, and converts the increased/decreased analog signal to a digital signal;

an input switching section that inputs, as the analog signal, either the test signal or the pixel signal to the analog-to-digital converter;

a correction value calculation section that, on the basis of the test signal and the digital signal, obtains a correction value for correcting an error in the selected analog gain, and outputs the correction value; and a correction section that corrects the digital signal according to the outputted correction value.

(10)

A solid-state imaging element control method including:

a test signal generation procedure of generating a test signal of a predetermined level;

an analog-digital conversion procedure of increasing/decreasing an analog signal according to an analog gain selected from among a plurality of analog gains, and converting the increased/decreased analog signal to a digital signal;

an input switching procedure of inputting, as the analog signal, either the test signal or the pixel signal to the analog-to-digital converter;

a correction value acquisition procedure of obtaining, on the basis of the test signal and the digital signal, a correction value for correcting an error in the selected analog gain, and outputting the correction value; and a correction procedure of correcting the digital signal according to the outputted correction value.

REFERENCE SIGNS LIST

100: Imaging device
110: Optical section
120: DSP circuit
130: Display section
140: Operation section
150: Bus
160: Frame memory
170: Storage section
180: Power source section
200: Solid-state imaging element
210: Vertical scanning circuit
220: Test signal source
230: DAC
240: Timing control circuit
250: Pixel array section
260: Pixel
261: Photoelectric conversion element
262: Transfer transistor
263: Reset transistor
264: Floating diffusion layer
265: Amplification transistor
266: Selection transistor
270: Input switching section
271, 340, 383, 388: Selector
280: Column signal processing section
281: ADC
282: Counter
300: Image processing section
310: Gain error measurement section
311: Sampling number counter
312: Update pulse generation section
315: Offset computation section
320: Correction value calculation section
330: Storage section
350: Correction section
360: Controller
380: Reference data accumulation section
381, 386: Output control section
382, 387: Adder
384, 389: Memory
385: Target domain data accumulation section
390: Gain correction coefficient computation section
391, 394: Multiplier
392: Divider 393, 395: Shift computation section
396: Shift number setting section
400: Comparator
410: Capacity ratio switching circuit
411 to 415: Switch
416 to 421, 440: Capacity
430: Differential amplification circuit
431, 432: pMOS transistor
433 to 435: nMOS transistor
436, 437: Auto-zero switch
12031: Imaging section

The invention claimed is:

1. A solid-state imaging element, comprising:
a test signal source configured to generate a test signal of a predetermined level;
an analog-to-digital converter configured to one of increase or decrease an analog signal according to an analog gain selected from among a plurality of analog gains, and convert the one of increased or decreased analog signal to a digital signal;
an input switching section configured to input, as the analog signal, either the test signal or a pixel signal to the analog-to-digital converter;
a correction value calculation section configured to obtain, based on the test signal and the digital signal, a correction value for correcting an error in the selected analog gain, and output the correction value; and
a correction section configured to correct the digital signal according to the outputted correction value.

2. The solid-state imaging element according to claim 1, wherein the analog-to-digital converter includes:
a comparator configured to compare the analog signal with a predetermined ramp signal, and output a result of the comparison, and
a digital signal generation section configured to generate the digital signal based on the result of the comparison, and the comparator includes:
a differential amplification circuit configured to amplify difference between a predetermined reference voltage and a voltage of a predetermined node, and output the amplified difference as the result of the comparison,
a vertical signal line-side capacity that is inserted between the predetermined node and the input switching section,
a ramp-side capacity that is inserted between the predetermined node and a digital-to-analog converter that generates the predetermined ramp signal, and
a switch configured to change a capacity ratio of the vertical signal line-side capacity and the ramp-side capacity according to a predetermined control signal.

3. The solid-state imaging element according to claim 2, wherein
the plurality of analog gains is classified into a plurality of gain domains in which different capacity ratios are set,
kinds of the predetermined level of the test signal include a high level that corresponds to a pixel signal when an incident light quantity is greater than a predetermined value and a low level that corresponds to a pixel signal when the incident light quantity is not greater than the predetermined value, and
the test signal source is further configured to supply only the high level for each of the plurality of gain domains during a signal level conversion time period for converting a signal level according to a light exposure quantity.

4. The solid-state imaging element according to claim 2, wherein
the plurality of analog gains is classified into a plurality of gain domains in which different capacity ratios are set,
kinds of the predetermined level of the test signal include a high level that corresponds to a pixel signal when an incident light quantity is greater than a predetermined value and a low level that corresponds to a pixel signal when the incident light quantity is not greater than the predetermined value, and
the test signal source is further configured to supply the high level and the low level sequentially for a reference gain domain among the plurality of gain domains during a signal level conversion time period for converting a signal level according to a light exposure quantity, and supply only the high level for remaining gain domains among the plurality of gain domains during the signal level conversion time period.

5. The solid-state imaging element according to claim 2, wherein
the plurality of analog gains is classified into a plurality of gain domains in which different capacity ratios are set, and
the test signal source is further configured to supply test signals as many as a sampling number that corresponds to the analog gain regarding a corresponding gain domain.

6. The solid-state imaging element according to claim 5, further comprising:
a reference data accumulation section configured to accumulate digital signals for a reference gain domain among the plurality of gain domains, and output a result of the accumulation as a first addition result; and
a target domain data accumulation section configured to accumulate the digital signals for each of the plurality of gain domains excluding the reference gain domain among the plurality of gain domains, and output a result of the accumulation as a second addition result,
wherein the correction value calculation section is further configured to calculate, as the correction value, a gain correction coefficient for correcting the analog gain based on the first addition result and the second addition result.

7. The solid-state imaging element according to claim 6, wherein the correction value calculation section includes:
a first shift computation section configured to carry out computation of shifting a predetermined maximum sampling number according to the sampling number in the reference gain domain,
a first multiplier configured to multiply a computation result obtained by the first shift computation section with the first addition result,
a second shift computation section configured to carry out computation of shifting the predetermined maximum sampling number according to sampling numbers in each of the plurality of gain domains excluding the reference gain domain,
a second multiplier configured to multiply a computation result obtained by the second shift computation section with the second addition result, and
a divider configured to divide a multiplication result obtained by the first multiplier, by a multiplication result obtained by the second multiplier, and output, as the gain correction coefficient, a result of the division.

8. The solid-state imaging element according to claim 6, wherein the correction value calculation section includes:

a first multiplier configured to multiply the sampling number in each of the plurality of gains domains excluding the reference gain domain, with the first addition result, a second multiplier configured to multiply the sampling number in the reference gain domain with the second addition result, and a divider configured to divide a multiplication result obtained by the first multiplier, by a multiplication result obtained by the second multiplier, and output, as the gain correction coefficient, a result of the division.

9. An imaging device, comprising:

a pixel array section that includes a plurality of pixels, wherein each of the plurality of pixels is configured to generate a pixel signal;

a test signal source configured to generate a test signal of a predetermined level;

an analog-to-digital converter configured to one of increase or decrease an analog signal according to an analog gain selected from among a plurality of analog gains, and convert the one of increased or decreased analog signal to a digital signal;

an input switching section configured to input, as the analog signal, either the test signal or the pixel signal to the analog-to-digital converter;

a correction value calculation section configured to obtain, based on the test signal and the digital signal, a correction value for correcting an error in the selected analog gain, and output the correction value; and a correction section configured to correct the digital signal according to the outputted correction value.

10. A solid-state imaging element control method, comprising:

generating a test signal of a predetermined level;

one of increasing or decreasing an analog signal according to an analog gain selected from among a plurality of analog gains, and converting the one of increased or decreased analog signal to a digital signal;

inputting, as the analog signal, either the test signal or a pixel signal to an analog-to-digital converter;

obtaining, based on the test signal and the digital signal, a correction value for correcting an error in the selected analog gain, and outputting the correction value; and correcting the digital signal according to the outputted correction value.

* * * * *